(12) United States Patent
Mooney

(10) Patent No.: US 11,627,296 B2
(45) Date of Patent: Apr. 11, 2023

(54) METHODS AND SYSTEMS FOR CONDITION MITIGATION

(71) Applicant: COMCAST CABLE COMMUNICATIONS, LLC, Philadelphia, PA (US)

(72) Inventor: Philip D. Mooney, Sellersville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/700,766

(22) Filed: Dec. 2, 2019

(65) Prior Publication Data

US 2021/0168346 A1  Jun. 3, 2021

(51) Int. Cl.
*H04N 9/77* (2006.01)
*H04N 9/31* (2006.01)
(Continued)

(52) U.S. Cl.
CPC .............. *H04N 9/77* (2013.01); *H04N 5/57* (2013.01); *H04N 5/602* (2013.01);
(Continued)

(58) Field of Classification Search
CPC .............. H04N 21/6125; H04N 7/181; H04N 21/2187; H04N 21/25808; H04N 21/25891; H04N 21/2662; H04N 21/2668; H04N 21/441; H04N 21/4438; H04N 21/4621; H04N 21/47205; H04N 21/47211; H04N 21/812; H04N 21/854; H04N 7/0127; H04N 5/23238; H04N 5/2353; H04N 21/234381; H04N 2005/2255; H04N 21/234318; H04N 21/44218; H04N 21/6582; H04N 5/2258; H04N 5/232; H04N 5/23203; H04N 5/235; H04N 5/247; H04N 5/57; H04N 13/341; H04N 19/115; H04N 19/124; H04N 19/132; H04N 19/136; H04N 19/146; H04N 19/152; H04N 19/184; H04N 19/61; H04N 21/23406; H04N 21/2368; H04N 21/24; H04N 21/41407; H04N 21/4223; H04N 21/4312; H04N 21/4325; H04N 21/440263; H04N 21/4436; H04N 21/47217; H04N 21/4858; H04N 21/6373; H04N 21/647; H04N 21/8456; H04N 5/2251; H04N 5/2256; H04N 5/23212; H04N 5/23267; H04N 5/2354; H04N 5/332;
(Continued)

(56) References Cited

U.S. PATENT DOCUMENTS 5,356,368 A * 10/1994 Monroe ................ A61M 21/00
600/28
10,952,011 B1 * 3/2021 Zappa ..................... H04R 3/00
(Continued)

FOREIGN PATENT DOCUMENTS

JP          2002-252792 A        9/2002

*Primary Examiner* — Samira Monshi
(74) *Attorney, Agent, or Firm* — Ballard Spahr LLP

(57) ABSTRACT

Methods and systems are described for condition mitigation. A computing device may display content. The computing device may determine that displaying and/or outputting the content may impact a person with a condition. The computing device may take an action to reduce an impact of the content on the person.

25 Claims, 16 Drawing Sheets

(51) Int. Cl.
   *H04N 5/57*        (2006.01)
   *H04N 5/60*        (2006.01)
   *H04N 21/47*       (2011.01)
   *H04N 21/485*      (2011.01)

(52) U.S. Cl.
   CPC ........... *H04N 9/3182* (2013.01); *H04N 21/47* (2013.01); *H04N 21/485* (2013.01)

(58) Field of Classification Search
   CPC ...... H04N 5/44543; H04N 5/63; H04N 5/772; H04N 5/915; H04N 7/15; H04N 9/7921
   See application file for complete search history.

(56) References Cited

U.S. PATENT DOCUMENTS

| | | | |
|---|---|---|---|
| 2008/0162151 A1* | 7/2008 | Cho | G10L 21/04 704/503 |
| 2009/0315708 A1* | 12/2009 | Walley | H03G 7/08 340/540 |
| 2012/0170909 A1* | 7/2012 | Chung | H04N 13/359 386/248 |
| 2017/0017462 A1* | 1/2017 | Kubiak | H04R 3/04 |
| 2019/0058843 A1* | 2/2019 | Suzuki | G09G 5/10 |
| 2019/0141287 A1* | 5/2019 | Shoa Hassani Lashdan | G06T 3/4007 |
| 2020/0324073 A1* | 10/2020 | Rajan Kesavelu Shekar | A63F 13/212 |

\* cited by examiner

METHODS AND SYSTEMS FOR CONDITION MITIGATION

BACKGROUND

Photosensitive Epilepsy (PSE) is a condition where exposure to flashing lights at certain intensities or to certain visual patterns can trigger seizures. Additionally, other conditions such as anxiety, Post-Traumatic Stress Disorder (PTSD), headaches, migraines, or any other condition may be exasperated by exposure to flashing lights or certain audio. Content (e.g., video content) displayed on a device may include flashing lights which, when shown in certain patterns (e.g., rapid changes in brightness), may lead to a seizure. Further, the content may have audio content, which when played, may impact people with certain conditions due to pulsations associated with the audio or a tone of the audio. When content is fast forwarded or fast rewound, lighting or audio changes which were of no risk when played at normal speed may negatively impact people with certain conditions.

SUMMARY

It is to be understood that both the following general description and the following detailed description are exemplary and explanatory only and are not restrictive. Methods and systems for condition mitigation are described. A computing device may determine that, when content is displayed at a standard playback speed, the content may cause problems to certain persons (e.g., impact people with a condition, cause a seizure, etc.). The computing device may modify one or more characteristics of the content to reduce the impact of the content on people with the condition and/or prevent the content from being displayed. For example, the computing device may reduce the brightness of scenes that have bright lights or flashing lights. As another example, the computing device may reduce a volume of the content. Additionally, in response to receiving a command to modify the playback speed (e.g., fast forward, fast rewind, slow forward, slow rewind, etc.), the computing device may determine that, when the content is displayed at the modified playback speed, the content may cause problems to certain persons (e.g., impact people with a condition, cause a seizure, etc.). Accordingly, the computing device may prevent the content from being displayed at the modified playback speed or may modify one or more characteristics of the content to reduce the impact of the content on people with the condition at the requested playback speed.

Additional advantages will be set forth in part in the description which follows or can be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
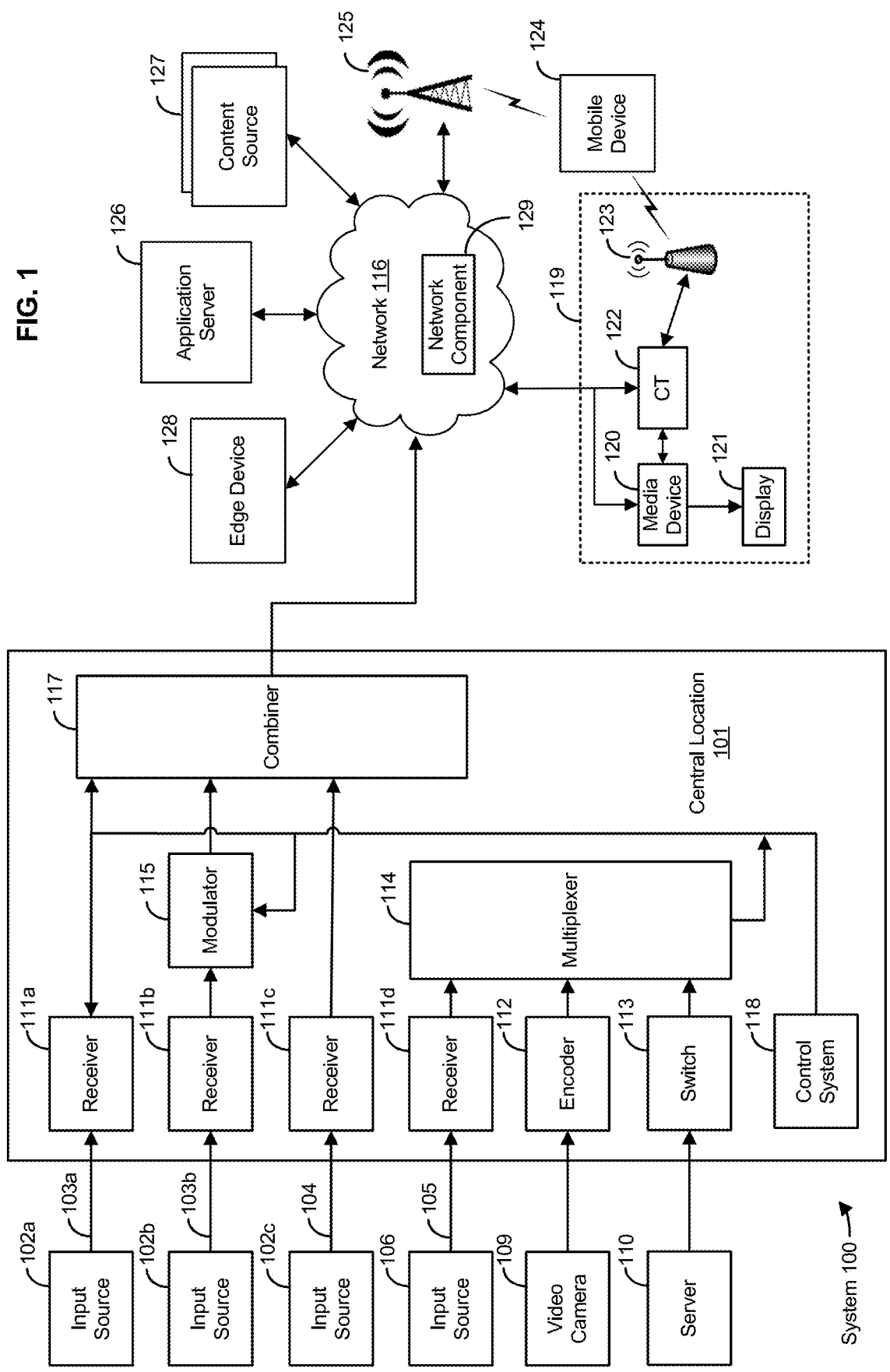
FIG. 1 shows an example system for condition mitigation.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

Methods and systems for condition mitigation are described wherein a computing device, such as a set-top-box or a display device, may analyze content (e.g., video images) that is displayed on a display device. In addition, the computing device may analyze stored content (e.g., not presently displayed). Since patterns and light transitions can be unpredictable in a live broadcast and can change depending on fast forward/fast rewind speed and even depending on what other menus or images are displayed, the computing device may monitor the content and detect a periodic intensity change and/or possibly dangerous pattern movement. If the computing device detects the periodic intensity change and/or the possible dangerous pattern of movement, the computing device may modify the content. For example, the computing device may darken the content to reduce the range of light/dark being displayed. The computing device may display a border around the content that indicates that condition mitigation is occurring. The computing device may un-modify (e.g., return to normal) the content if the periodic intensity change or the possibly dangerous pattern is no longer detected. Additionally, for a computing device recording content (e.g., a video stream), mitigation may happen before, during, and/or after the video content (e.g., video content) is recorded. For example, the computing device may perform the mitigation prior to the video content being recorded. As another example, the computing device may perform mitigation during playback of the recorded video content after the video content has been recorded. Further, the computing device may determine whether audio associated with the video content may impact a viewer. For example, loud sounds, such as explosions or gunshots, may impact the viewer. The computing device may modify the audio content to reduce the impact of the sounds on the viewer. As an example, the computing device may reduce one or more frequencies associated with the loud sounds such that the viewer may not be impacted by the audio content.

FIG. 1 shows an example system 100 for condition mitigation. Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., location 119) via a network 116 (e.g., content distribution and/or access system).

The central location 101 may receive content from a variety of sources 102*a*, 102*b*, and 102*c*. The content may be sent from the source to the central location 101 via a variety of transmission paths, including wireless (e.g., satellite paths 103*a*, 103*b*) and a terrestrial path 104. The central location 101 may also receive content from a direct feed source 106 via a direct line 105. Other input sources may be capture devices such as a video camera 109 or a server 110. The signals provided by the content sources may include a single content item, a portion of a content item (e.g., content fragment, content portion, content section), a content stream, a plurality of content streams, a multiplex that includes several content items, and/or the like. The plurality of content streams may have different bitrates, framerates, resolutions, codecs, languages, and so forth. The signals provided by the content sources may be video frames and audio frames that have metadata. The metadata of the video frames and the audio frames may be used to determine, and correct if necessary, a synchronization error between the video frames and the audio frames.

The central location 101 may be one or a plurality of receivers 111*a*, 111*b*, 111*c*, 111*d* that are each associated with an input source. MPEG encoders such as encoder 112, are included for encoding local content or a video camera 109 feed. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114.

Data may be inserted into the content at the central location 101 by a device (e.g., the encoder 112, the multiplexer 114, the modulator 115, and/or the combiner 117). The data may be metadata. The device may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with an encoder and/or transcoder, such as an MPEG encoder and/or transcoder. The metadata may also be inserted at other stages in a content distribution network such as at a packager, at a cache device associated with the content distribution network, at an input to the client device, or by any device at any point in the content distribution network.

The metadata may be inserted into every video frame and/or audio frame, and the metadata may be inserted into the video frames and/or the audio frames based on an interval. The metadata may be information associated with whether each video frame contains visual effects that may impact a person having a condition. For example, the condition may be Photosensitive Epilepsy (PSE), anxiety, Post-Traumatic Stress Disorder (PTSD), headaches, migraines, or any other condition may be exasperated by exposure to flashing lights or certain audio. The metadata may indicate a video frame and/or portions of the video frame that may impact the person with the condition. For example, only a portion of a video frame may comprise a visual effect that may impact the person with the condition. The metadata may indicate the portion of the video frame that comprises the visual effect that may impact the person with the condition. The metadata may also indicate that audio may impact the person with the condition. For example, the metadata may indicate that audio associated with the video frame may impact the person with the condition. As another example, the metadata may indicate that an audio frame may contain audio that may impact the person with the condition. The metadata may indicate an audio frame and/or portions of the audio frame that may impact the person with the condition. For example, only a portion of the audio frame may comprise an effect that may impact the person with the condition. The metadata may indicate the portion of the audio frame that comprises the effect that may impact the person with the condition.

The central location 101 may be one or more modulators 115 for interfacing to a network 116. The modulators 115 may convert the received content into a modulated output signal suitable for transmission over the network 116. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like. The network 116 may facilitate delivery of audio content and video content. The audio content may be sent in one or more streams of content. The one or more streams of audio content may have different bitrates, framerates, resolutions, codecs, languages, and so forth. The video content may be sent in one or more streams of content. The one or more streams of video content may have different bitrates, framerates, resolutions, codecs, languages, and so forth. The audio content may be audio frames, and the video content may be video frames. Additionally, the audio content and the video content may have metadata. The metadata may indicate one or more characteristics (e.g., properties) of the audio content and the video content.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The signals may be one or more streams of content. The streams of content may be audio content and/or video content. The audio content may have a stream separate from the video content. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116 at one or more of the user locations. At the user location 119, a media device 120 may demodulate and/or decode (e.g., determine one or more audio frames and video frames), if needed, the signals for display on a display device 121, such as on a television set (TV) or a computer monitor. The media device 120 may be a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a combination thereof, and/or the like. The media device 120 may have one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The media device 120 may receive the content and determine whether the content contains effects that may impact a person with a condition. The media device 120 may receive audio content and video content. The audio content may have one or more audio frames. The video content may have one or more video frames. The one or more audio frames and the one or more video frames may have metadata. The metadata may be inserted into every audio frame and every video frame. The metadata may be inserted into the audio frames and the video frames based on an interval. The metadata may be information associated with whether the video content and/or the audio content contains effects and/or audio that may impact a person with a condition. The media device 120 may modify the content upon detecting the metadata within the video content and/or the audio content that indicates that the person with the condition may be impacted by consuming (e.g., viewing, watching, listening, hearing, etc.) the content. For example, the media device 120 may reduce the brightness of the content to reduce the impact of a visual effect on the person.

The media device 120 may perform image analysis on the received content to determine whether the content contains effects that may impact a person with a condition. For example, the media device 120 may receive video content, and the media device 120 may process the received content to determine how the received content would be presented to a person viewing the content. The media device 120 may perform image analysis on the received content after the received content has been processed to determine how the received content would be displayed. For example, the media device 120 may analyze every frame of the received content to determine whether each of the frames have areas of brightness that may impact a person with a condition. As an example, the media device 120 may perform image analysis on each of the frames to determine a relative brightness for each portion of the frame. For example, each frame may have a plurality of portions, and the media device 120 may compare each portion to the one or more of the plurality of portions to determine the relative brightness for each portion. If the media device 120 determines that the frame comprises a portion that has a relative brightness that satisfies a threshold, the media device 120 may modify the portion of the frame to reduce the relative brightness of the portion to reduce the impact of the portion on the person with the condition.

As another example, the media device 120 may compare a frame to one or more additional frames to determine a change in a characteristic between the frame and the one or more additional frames. The characteristic may be a brightness, a contrast, a volume, an effect, or any characteristic that changes between the frame and the one or more additional frames. For example, the characteristic may brightness and a change in brightness between the frames may be determined. As an example, the first frame may have a first brightness and a second frame may have a second brightness. The media device 120 may compare the first brightness and the second brightness to determine whether the brightness has changed (e.g., determine whether the brightness and/or the change in brightness satisfies a threshold). If the brightness has changed by an amount that satisfies a threshold, the media device 120 may modify the frames to reduce the impact of the brightness. As an example, the media device 120 may modify (e.g., reduce, increase, etc.) the first brightness and/or the second brightness to reduce the impact of the change between the first brightness and the second brightness.

The media device 120 may compare the frames based on the display order of the frames. As an example, the media device 120 may compare a first frame to a second frame that precedes the first frame in the display order to determine whether there is a change in brightness between the two frames that satisfies a threshold (e.g., the change in brightness may impact the person with the condition). If the media device 120 determines that there is a change in brightness between the first and second frame that satisfies the threshold, the media device 120 may modify either the first frame or the second frame to reduce the change in brightness. Of note, the first frame and the second frame may not be adjacent to each other in the content. For example, a viewer of the content may modify playback of the content (e.g., the viewer initiates a trick play such as fast forward, fast rewind, etc.). During the playback of the content, the media device 120 may only cause output (e.g., cause display) of every third frame of the content. Thus, the first frame and the second frame may be two frames a part. Accordingly, the media device 120 may analyze the frames of the content based on the playback speed of the content to determine whether the frames, as displayed to a viewer, may impact the viewer.

The term playback, as used herein, includes a variety of different playback situations. For example, the term playback includes display of linear content, display of live content (e.g., content not previously recorded), display of previously recorded content, display of on demand content, and so forth. Additionally, playback may occur at various playback speeds. As an example, a user may initiate a trick play (e.g., fast forward, fast rewind, slow forward, slow rewind, skip, etc.) that modifies the playback speed. Thus, as will be appreciated by one skilled in the art, the term playback as used herein is directed toward the playback of any content at any speed.

The media device 120 may modify a volume of audio and/or tone of the audio content to reduce the impact of the audio content on a person with a condition. For example, the audio content may include loud sounds (e.g., gunshots, explosions, low frequencies, etc.) that may impact a person with a condition. The media device 120 may analyze the audio content to determine whether one or more frequencies of the audio content may impact the person with the condition. If the media device 120 determines that the one or more frequencies of the audio content satisfies a threshold (e.g., the audio content may impact the person with the condition), the media device 120 may modify the audio content to reduce the volume of the one or more frequencies that satisfies the threshold. As an example, the audio content may have a plurality of frames of audio content. The media device 120 may analyze one or more of the plurality of frames of the audio content to determine whether any of the audio frames have frequencies that may impact the person with the condition. If the media device 120 determines that one or more of the audio frames have frequencies that may impact the person with the condition, the media device 120 may modify the audio content to reduce the volume of the frequencies to reduce the impact on the person with the condition. As another example, the media device 120 may simply remove the audio content that has the frequencies that satisfy the threshold such that the audio content is not output. Thus, the media device 120 may determine whether the audio content may impact the person with the condition, and the media device 120 may modify the audio content to reduce (e.g., minimize) the impact of the audio content on the person with the condition.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. For a cable network, the communication terminal 122 may be configured to provide network access via a variety of communication protocols and standards, such as Data Over Cable Service Interface Specification (DOCSIS).

The user location 119 may have a first access point 123, such as a wireless access point. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The system 100 may have one or more content sources 127. The content source 127 may be configured to provide content (e.g., video, audio, games, applications, data) to the user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The content source 127 may provide audio content and video content. The content source 127 may provide one or more audio frames of audio content and one or more video frames of video content. The content source 127 may encode the audio frames and the video frames. The content source 127 may encode metadata into the audio frames and the video frames. The metadata encoded by the content source 127 may include information that indicates whether the metadata may be information associated with whether the video content and/or the audio content contains effects and/or audio that may impact a person with a condition. For example, the metadata may indicate that the video content and/or the audio content includes content that may impact a person with a condition when the person with the condition consumes (e.g., viewing, watching, listening, hearing, etc.) the content.

Data may be inserted into the content at the content source 127. The data may be metadata. The content source 127 may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with content source 127. The metadata may also be inserted at other stages in a content distribution network such as at a packager, at a cache device associated with the content distribution network, at an input to the client device, or by any device at any point along the content distribution. While the content source 127 has been described as providing the audio content and video content, as well as encoding the metadata, for ease of explanation, a person of ordinary skill in the art would appreciate that any device in the system 100 may provide the content as well as encode the metadata such as, the edge device 128, described further below.

The system 100 may be an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. The edge device 128 may cache or otherwise store content (e.g., frequently requested content) to enable faster delivery of content to users.

The network 116 may have a network component 129. The network component 129 may be any device, module, and/or the like communicatively coupled to the network 116. The network component 129 may also be a router, a switch, a splitter, a packager, a gateway, an encoder, a storage device, a multiplexer, a network access location (e.g., tap), physical link, and/or the like.

Any of the application server 126, the content source 127, the edge device 128, and/or the media device 120 may serve as a server relative to a user device, such as the media device 120 and/or the mobile device 124, and may determine whether the content has effects that may impact a person with a condition. Accordingly, any device within the system 100 may determine whether the content has effects that may impact the person with the condition.

Figure 2:
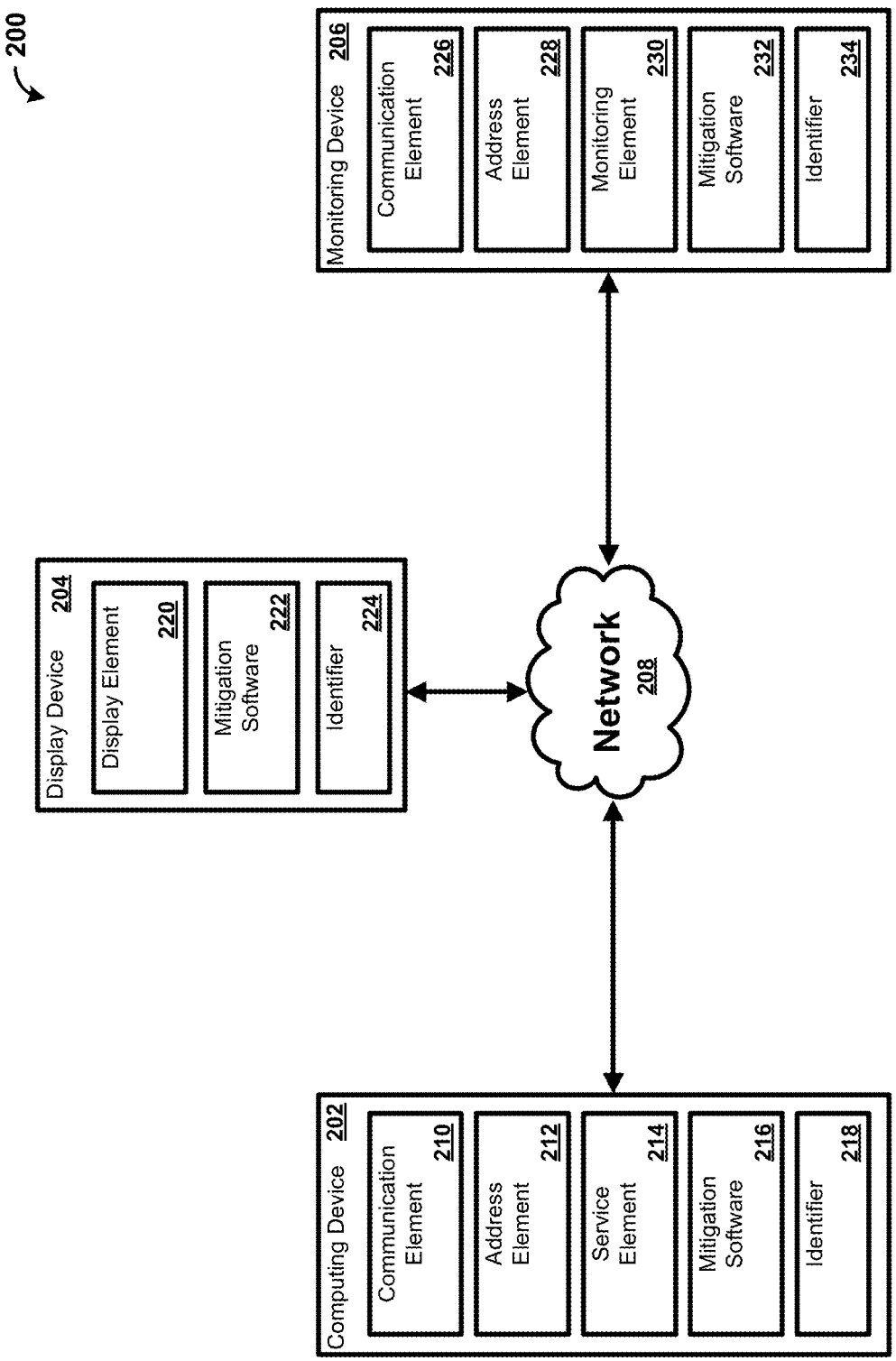
FIG. 2 shows an example system for condition mitigation.

FIG. 2 shows a system 200 for condition mitigation. The system 200 may include a computing device 202, a display device 204, and a monitoring device 206. The computing device 202 may communicate with the display device 204 and/or the monitoring device 206 via a network 208 (e.g., the network 116 of FIG. 1). The network 208 may support communication between the computing device 202 and the display device 204 via a short-range communications (e.g., BLUETOOTH®, near-field communication, infrared, etc.) and/or via a long-range communications (e.g., Internet, cellular, satellite, and the like). The computing device 202 may communicate with the display device 204 via a direct communication link, channel, and/or interface that does not include the network 208. The computing device 202 and the display device 204 may be part of and/or components of a single device.

The computing device 202 (e.g., the media device 120, the communication terminal 122, the mobile device 124, the application server 126, the content source 127, the edge device 128, etc.) may include a communication element 210, an address element 212, a service element 214, mitigation software 216, and an identifier 218.

The communication element 210 may be configured to communicate via any network protocol. For example, the communication element 210 may communicate via wired network protocol (e.g., Ethernet, LAN, etc.). The communication element 210 may have a wireless transceiver configured to send and receive wireless communications via a wireless network (e.g., the network 208). The wireless network may be a Wi-Fi network. The computing device 202 may communicate with the display device 204 and/or the monitoring device 206 via the communication element 210.

The computing device 202 may include an address element 212 and a service element 214. The address element 212 may comprise or provide an internet protocol address, a network address, a media access control (MAC) address, an Internet address, or the like. The address element 212 may be used to establish a communication session between the computing device 202, the display device 204, the monitoring device 206, and/or other devices and/or networks. The address element 212 may be an identifier or locator of the computing device 202. The address element 212 may be persistent for a particular network (e.g., the network 208).

The service element 214 may comprise an identification of a service provider associated with the computing device 202 and/or with the class of computing device 202. The class of the computing device 202 may be related to a type of device, capability of device, type of service being provided, and/or a level of service (e.g., business class, service tier, service package, etc.). The service element 214 may comprise information relating to or provided by a service provider (e.g., Internet service provider, content service provider, etc.) that provides or enables data flow such as communication services and/or content services to the computing device 202. The service element 214 may comprise information relating to a preferred service provider for one or more particular services relating to the computing device 202. The address element 212 may be used to identify or retrieve data from the service element 214, or vice versa. One or more of the address element 212 and/or the service element 214 may be stored remotely from the computing device 202. Other information may be represented by the service element 214.

The computing device 202 may be associated with a user identifier or device identifier 218. The device identifier 218 may be any identifier, token, character, string, or the like, for differentiating one user or computing device (e.g., the computing device 202) from another user or computing device. For example, the device identifier 218 may be or relate to an Internet Protocol (IP) Address IPV4/IPV6, a media access control address (MAC address), an International Mobile Equipment Identity (IMEI) number, an International Mobile Subscriber Identity (IMSI) number, a phone number, a SIM card number, and/or the like. The device identifier 218 may identify a user or computing device as belonging to a particular class of users or computing devices. The device identifier 218 may comprise information relating to the computing device 202 such as a manufacturer, a model or type of device, a service provider associated with the computing device 202, a state of the computing device 202, a locator, and/or a label or classifier. Other information may be represented by the device identifier 218.

The computing device 202 may include mitigation software 216. The mitigation software 216 may be software, firmware, hardware, and/or a combination of software, firmware, and hardware. The mitigation software 216 may allow the computing device 202 to determine one or more portions and/or frames of content that may have effects that may impact a viewer who has a condition, such as PSE, anxiety, PTSD, headaches, migraines, and so forth. The computing device 202 may receive content from, and/or via, one or more content sources (e.g., the application server 126, the content source 127, the edge device 128, the network component 129, etc.). The computing device 202 may receive the content via the communication element 210.

The computing device 202 may monitor a signal destined for the display device 204. For example, the computing device 202 may receive content via a signal that is to be output to the display device 204. The computing device 202 may monitor the signal for an indication that the signal may impact a viewer with a condition. The computing device 202 may receive the signal and perform signal processing on the signal (e.g., utilizing the mitigation software 216) to determine whether the content may impact the viewer with the condition. If the computing device 202 determines that the content may impact the viewer, the computing device 202 may take one or more actions to reduce the impact of the content on the viewer with the condition. As an example, if the content is video content with bright lights, the computing device 202 may modify the content to reduce the brightness of the content so that the brightness of the lights are reduced. As another example, the computing device 202 may instruct the display device 204 to reduce an output brightness of the display device 204.

The computing device 202 may receive content via a signal and/or a stream that is encrypted or encoded. Thus, the content, as received by the computing device 202, may not be in the form that will be presented to the user. Accordingly, the computing device 202 may convert and/or decrypt the received content into a form that is representative of what the viewer with the condition may see. Once the computing device 202 has converted and/or decrypted the received content into the form that is representative of what the viewer with the condition may see, the computing device 202 may then process the content to determine if one or more actions need to be taken to reduce the impact of the content on the viewer with the condition. If the computing device 202 determines that the one or more actions needs to be taken, the computing device 202 may modify the content accordingly to reduce the impact of the content on the viewer with the condition. The computing device 202 may then encode and/or encrypt the modified content. For example, the computing device 202 may encode and/or encrypt the modified content based on the encoding and/or the encryption associated with the signal and/or the stream that the computing device 202 received. That is, the computing device 202 may encode and/or encrypt the modified content so that the modified content is in the same encryption and/or encoding form as the originally received content. The computing device 202 may then provide the modified content to the display device 204.

The mitigation software 216 may determine (e.g., decode), from the received content, mitigation data (e.g., metadata) embedded in the content. The mitigation data may be embedded by the content source or any intermediary device. The mitigation data may indicate the one or more portions and/or frames that may have effects that may impact a viewer who has a condition. The mitigation data may include a timestamp or frame number for a start of a visual effect that may impact the viewer with the condition, as well as an end of the visual effect or a duration of the visual effect. The metadata may indicate portions of content that may impact a viewer with a condition when the content is displayed at an atypical (e.g., not normal) playback speed. Further, the mitigation data may indicate an intensity (e.g., severity, etc.) of the effect. The intensity of the visual effect may be utilized to determine whether a threshold associated with the visual effect is satisfied. For example, the intensity of the visual effect may be indicated based on a scale of 1 to 10. A user (e.g., the viewer with the condition) may indicate that any visual effects having an intensity greater than 3 need to be mitigated (e.g., modified) in order for the visual effects to not impact the viewer with the condition. Accordingly, a computing device may determine, based on the metadata, any visual effects that have an intensity that is greater than 3, and perform mitigation to reduce the intensity of the visual effect. Additionally, the mitigation data may indicate a region of content and/or a region of a display that contains the visual effect.

The mitigation software 216 may determine that content (e.g., received content) may contain effects that may impact a viewer with a condition. The visual effect may be a visual output of content. The visual effect and/or the content may have one or more characteristics. The metadata may indicate the one or more characteristics of the visual effect and/or content. The metadata may indicate that the content that has the effects. For example, the mitigation software 216 can utilize the metadata associated with the content to determine that the content contains visual effects that may impact the viewer with the condition. As an example, the metadata may indicate one or more frames of the content that contains the visual effects. The metadata may indicate portions of the frames that contain the visual effects. The mitigation software 216 may analyze the metadata to determine the portions of the content and/or the frames that may cause a problem for the viewer with the condition.

The mitigation software 216 may perform image analysis on the received content to determine whether the content contains effects that may impact a person with a condition. For example, the mitigation software 216 may process received content to determine how the received content would be presented to a person viewing the content. As an example, the mitigation software 216 may decode encoded content to determine the content as the content would be displayed to the person viewing the content.

The mitigation software 216 may perform image analysis on the received content after the received content has been processed to determine how the received content would be displayed. The mitigation software 216 may determine whether one or more visual effects that may impact a person with a condition are present in the received content based on image analysis. For example, the received content may have a plurality of content frames, and the mitigation software 216 may analyze every frame of the received content to determine whether each of the frames have areas of brightness that may impact a person with a condition. As an example, the mitigation software 216 may perform image analysis on each of the frames to determine a relative brightness for each portion of the frame. Each frame may have a plurality of portions, and the mitigation software 216 may compare each portion to the one or more of the plurality of portions to determine the relative brightness for each portion. If the mitigation software 216 determines that the frame comprises a portion that has a relative brightness that satisfies a threshold, the mitigation software 216 may modify the portion of the frame to reduce the relative brightness of the portion to reduce the impact of the portion on the person with the condition.

The mitigation software 216 may compare a frame to one or more additional frames to determine a visual effect that may impact the person with the condition. The mitigation software 216 may compare the frames based on the display order of the frames. As an example, the mitigation software 216 may compare a first frame to a second frame that precedes the first frame in the display order to determine whether there a visual effect between the two frames that may impact the person with the condition. For example, the mitigation software 216 may determine that a change in brightness between the two frames satisfies a threshold (e.g., the change in brightness may impact the person with the condition). If the mitigation software 216 determines that there is a change in brightness between the first and second frame that satisfies the threshold, the mitigation software 216 may modify either the first frame or the second frame to reduce the change in brightness. While brightness was used as an example for ease of explanation, a person of ordinary skill in the art would appreciate that the mitigation software 216 may determine any visual effect that may impact the viewer with the condition utilizing image analysis.

Of note, the first frame and the second frame may not be adjacent to each other in the content. For example, a viewer of the content may modify playback of the content (e.g., the viewer initiates a trick play such as fast forward, fast rewind, etc.). During the playback of the content, the computing device 202 may only cause output (e.g., cause display) of every third frame of the content. Thus, the first frame and the second frame may be two frames a part even though the first frame and the second frame may be shown one after the other. Accordingly, the mitigation software 216 may determine, based on the playback speed, that the second frame will be output for display immediately after the first frame even though the first and second frame are not adjacent in the content. Thus, the mitigation software 216 may determine whether a visual effect between the first and second frame may impact a person with a condition even though the first and second frame are not adjacent in the content. Accordingly, the mitigation software 216 may analyze the frames of the content based on the playback speed of the content to determine whether the frames, as displayed to a viewer, may impact the viewer.

The mitigation software 216 may analyze (e.g., using image analysis) the portions of the content and/or the frames to determine whether the content and/or the frames may cause a problem for the viewer with the condition. For example, after determining (e.g., identifying) the portions of the content and/or the frames that may cause a problem for the viewer with the condition (e.g., based on the metadata, image analysis, etc.), the mitigation software 216 may analyze the effects found in the determined content to determine whether the content may cause a problem for the viewer with the condition. If the content may cause a problem for the viewer with the condition, the mitigation software 216 may modify the content as displayed to prevent any negative side effects associated with the condition. For example, the mitigation software 216 may modify the brightness (e.g., dim) of the content, alter the colors of the content, display the content in grayscale (e.g., black and white), may not display the content, may block one or more portions (e.g., the portions with the visual effect, the majority of the content except for a small border of the content, etc.) of the content from being displayed, may provide a notice to indicate that visual effects that may cause problems for a viewer with the condition have been detected and will not be displayed, and so forth, as well as any combination of the aforementioned modifications.

Stated differently, the mitigation software 216 may evaluate the content and may modify the content as displayed to mitigate the problems for the viewer with the condition. As an example, when any of the following visual effects are detected: periodic high contrast changes (light/dark) with periods from 5 Hz to 30 Hz, intense red color over 25% of a display (e.g., screen) of the display device, bold patterns or regular and moving patterns, and so forth, the mitigation software 216 may modify the content to mitigate the impact of the visual effects on the viewer with the condition. The mitigation software 216 may begin mitigation (e.g., modify the content to reduce the impact of the visual effects) within a period of time (e.g., 1 second) of detecting at least one of the visual effects. The mitigation software 216 may continue mitigating the content for a period of time (e.g., 5 seconds) after the visual effects are no longer detected.

The mitigation software 216 may provide an alternative output rather than display the content. For example, after the mitigation software 216 determines that the content contains one or more visual effects that may impact a person with a condition, the mitigation software may prevent the content from being output and cause output of alternative content. As an example, the mitigation software 216 may cause output of a notification indicating that mitigation is currently occurring to indicate to the person with the condition the reason behind the content not being displayed.

The computing device 202 may be configured to record content (e.g., video content, audio content). For example, the computing device 202 may be a Digital Video Recorder (DVR). The mitigation software 216 may analyze the content to determine whether the content contains any effects that may impact a viewer with a condition. The mitigation software 216 may modify the video content to reduce the impact to the viewer with the condition. The mitigation software 216 may modify the content before the content is recorded, while the content is being record, and/or after the content is recorded. That is, the mitigation software 216 may perform the mitigation prior to the video content being recorded, the mitigation software 216 may perform the mitigation while the video content is being recorded, and/or the mitigation software 216 may perform mitigation during playback of the recorded video content after the video content has been recorded.

As another example, the computing device 202 may receive content from a security camera (not shown), and record security camera footage. As an example, a user associated with the computing device 202 may have one or more security camera's associated with their residence (e.g., the user location 119 of FIG. 1). The computing device 202 may receive the security camera footage directly from the security camera. The mitigation software 216 may analyze the security camera footage to determine whether the content contains any effects that may impact a viewer with a condition. For example, the mitigation software 216 analyze the security camera footage in real time (e.g., a live feed from the security camera that is displayed for the user). The mitigation software 216 may modify the security camera footage to reduce the impact to the viewer with the condition. However, the mitigation software 216 may be selective in the mitigation to the security camera footage. For example, the mitigation software 216 may recognize that the security camera footage needs to be minimally modified because the security camera footage is significantly more important than content designed for consumption (e.g., a movie, a TV show, a sporting event, etc.) and it can be determined that the value of the security camera footage would be greatly diminished if the security camera footage was significantly altered. Accordingly, the mitigation software 216 may weigh the modifications to be made to the content based on the type of content that needs to be modified. Additionally, where artificial intelligence is used to detect security triggers from the security camera footage, such as motion or changes in lighting, the input to the artificial intelligence may not be modified by the mitigation software 216. That is, the artificial intelligence may receive an un-modified version of the security camera footage so as to not reduce the effectiveness of detecting the security triggers. Additionally, the mitigation software 216 store an unaltered version of the security camera footage to ensure that no portion of the security camera footage is lost by the modifications. Thus, the mitigation software 216 may modify the security camera footage to reduce the impact to the viewer with the condition, while also maintaining the value of the security camera footage by ensuring an unaltered version of the security camera footage is available.

The mitigation software 216 may analyze the content based on various playback speeds (e.g., 2×, 3×, 4×, etc.) to determine whether the content, when played back at the various playback speeds, may cause an issue for the viewer with the condition. That is, the content may not cause a problem for the viewer with the condition when played at a first playback speed (e.g., a normal playback speed), but when the content is speed up (e.g., by a trick play), the content may cause a problem for the viewer with the condition. Accordingly, the mitigation software 216 may analyze the content at various playback speeds prior to the content being displayed to ensure the content may not pose a problem for the viewer with the condition.

The mitigation software 216 may analyze the content based on a requested playback speed. For example, the mitigation software 216 may receive an indication (e.g., a command) that the viewer desires to modify the playback speed of the content. The indication may indicate a desired playback speed (e.g., 2×, 3×, 4×, etc.). The mitigation software 216 may analyze the content, based on the desired playback speed, to determine whether causing display of the content at the desired playback speed may cause a problem for the viewer with the condition. For example, the mitigation software 216 may analyze the content, based on the desired playback speed, to determine whether any effects associated with the content may pose a problem for the viewer with the condition if the content is displayed at the desired playback speed. As an example, the content, when played at a normal playback speed, may not impact the viewer with the condition. However, when the content is played a speed other than the normal playback speed (e.g., fast forward/rewind, slow forward/rewind), the content may impact the viewer with the condition.

The mitigation software 216 may take one or more actions to prevent the viewer with the condition from being impacted by the content being played at the desired speed. For example, the mitigation software 216 may prevent the content from being played at the desired speed if doing so may impact the viewer with the condition. As an example, the mitigation software 216 may deny the requested change in speed. That is, the mitigation software 216 may prevent (e.g., ignore) the request for the desired speed and continue to playback the content at the normal playback speed. The mitigation software 216 may provide a notification indicating why the playback speed of the content was not adjusted. As another example, the mitigation software 216 may allow the content to be played at the desired speed, but the mitigation software 216 may only cause display of (e.g., output) a notification. As an example, the mitigation software 216 may allow playback of the content at the desired speed, but the mitigation software 216 may not output the content at the desired speed. Rather, the mitigation software 216 may simply output a notification indicating that the content is being played at the desired speed, but the content is not being displayed in order to prevent the user from being impacted by the playback of the content at the desired speed. The notification may be a blank screen, text, or any notification.

If causing display of the content at the desired playback speed may cause a problem for the viewer with the condition, the mitigation software 216 may modify the content as displayed at the desired playback speed to mitigate the impact of the visual effects to the viewer with the condition. For example, the mitigation software 216 may modify the content to reduce the impact of the visual effects at the desired playback speed and/or the mitigation software 216 may indicate to another device (e.g., the display device 204) to take one or more actions to mitigate the impact of the visual effects (e.g., reduce a brightness of the display device 204 during the playback of the content) at the desired playback speed.

The mitigation software 216 may receive an indication from another device (e.g., the display device 204, the monitoring device 206, and/or another computing device 202) that indicates that the content as displayed may cause a problem for the viewer with the condition. The mitigation software 216 may take one or more actions based on the received indication. For example, the mitigation software 216 may modify the content to reduce the impact of the visual effects based on the received indication.

The mitigation software 216 may send data to another device that indicates that the another advice should modify one or more settings associated with the another device. That is, the mitigation software 216 may adjust one or more setting of the another device instead of modifying the content. For example, after determining that the content may contain a visual effect that may impact the viewer with the condition, the mitigation software 216 may send data (e.g., a communication, a signal, a request, a packet, etc.) to the display device 204 to cause the display device 204 to modify one or more settings of the display device 204. As an example, the mitigation software 216 may send data to the display device 204 indicating that the display device 204 should reduce a brightness setting of the display device 204 to reduce the impact of a visual effect of the content.

The display device 204 may have a display element 220, mitigation software 222, and an identifier 224. The display device 204 may communicate with the computing device 202 via a direct communication link, channel, and/or interface that does not include the network 208. The computing device 202 and the display device 204 may be part of and/or components of a single device. The display device 204 may be any device configured to display content such as a television (TV), a monitor, and so forth.

The display device 204 may display (e.g., cause the display element 220 to display) content received from the computing device 202. The display element 220 may display the content via a screen associated with the display element 220. The display element 220 may be a Liquid Crystal Display (LCD), plasma display, and so forth. The display device 204 may display content that is received from another device (e.g., the computing device 202). For example, the computing device 202 may send (e.g., transmit, provide, etc.) the content to the display device 204, and the display device 204 may display the content. The display device 204 may display modified content. For example, the computing device 202 may modify the content prior to sending the content to the display device 204. As an example, the computing device 202 may modify the content to mitigate the impact of any visual effects within the content to reduce the impact on the viewer with the condition.

The display device 204 may be associated with a user identifier or device identifier 224. The device identifier 224 may be any identifier, token, character, string, or the like, for differentiating one user or display device from another user or display device. For example, the device identifier 224 may be or relate to an Internet Protocol (IP) Address IPV4/IPV6, a media access control address (MAC address), an International Mobile Equipment Identity (IMEI) number, an International Mobile Subscriber Identity (IMSI) number, a phone number, a SIM card number, and/or the like. The device identifier 224 may identify a user or display device as belonging to a particular class of users or display devices. The device identifier 224 may comprise information relating to the display device 204 such as a manufacturer, a model or type of device, a service provider associated with the display device 224, a state of the display device 224, a locator, and/or a label or classifier. Other information may be represented by the device identifier 224.

The display device 204 may monitor a signal received from another device (e.g., the computing device 202). For example, the display device 204 may receive content via a signal that is to be output by the display device 204. The display device 204 may monitor the signal for an indication that the signal may impact a viewer with a condition. The display device 204 may receive the signal and perform signal processing on the signal (e.g., utilizing the mitigation software 222) to determine whether the content may impact the viewer with the condition. If the display device 204 determines that the content may impact the viewer, the display device 204 may take one or more actions to reduce the impact of the content on the viewer with the condition. As an example, if the content is video content with bright lights, the display device 204 may modify the content to reduce the brightness of the content so that the brightness of the lights are reduced. As another example, the display device 204 may modify one or more settings of the display device 204 to reduce an output brightness of the display device 204.

The display device 204 may receive content via a signal and/or a stream that is encrypted or encoded. Thus, the content, as received by the display device 204, may not be in the form that will be presented to the user. Accordingly, the display device 204 may convert and/or decrypt the received content into a form that is representative of what the viewer with the condition may see. Once the display device 204 has converted and/or decrypted the received content into the form that is representative of what the viewer with the condition may see, the display device 204 may then process the content to determine if one or more actions need to be taken to reduce the impact of the content on the viewer with the condition. If the display device 204 determines that the one or more actions needs to be taken, the display device 204 may modify the content accordingly to reduce the impact of the content on the viewer with the condition. The display device 204 may then encode and/or encrypt the modified content. For example, the display device 204 may encode and/or encrypt the modified content based on the encoding and/or the encryption associated with the signal and/or the stream that the display device 204 received. That is, the display device 204 may encode and/or encrypt the modified content so that the modified content is in the same encryption and/or encoding form as the originally received content. The display device 204 may then cause output of the modified content.

The display device 204 may include mitigation software 222. The mitigation software 222 may include the capabilities of the mitigation software 216. Stated differently, the mitigation software 222 may be configured the same as the mitigation software 216. The mitigation software 222 may be configured to modify one or more settings of the display device 204. For example, the mitigation software 222 may determine that content received by the display device 204 has a visual effect that may impact a person with a condition. The mitigation software 222 may modify one or more settings associated with the display device 204 to reduce the impact of the visual effect on the person with the condition. As an example, the mitigation software 222 may reduce a brightness setting associated with the display device 204 to reduce the impact of a bright portion of the content on the person with the condition. As another example, the mitigation software 222 may receive data from another device that indicates that one or more settings of the display device 204 should be modified. For example, the mitigation software 222 may receive data from the computing device 202 indicating that the display device 204 should modify one or more settings of the display device 204. The mitigation software 222 may modify the one or more setting of the display device 204 based on the data received from the another device. Thus, the mitigation software 222 may be configured to modify one or more setting of the display device 204.

While the display device 204 is shown as being a separate device from the computing device 202 and the monitoring device 206, the display device 204 may be associated with the computing device 202 and/or the monitoring device 206. For example, the computing device 202 and/or the monitoring device 206 may be a device that has a display such as a smartphone, a tablet, a laptop, and so forth.

The monitoring device 206 may include a communication element 226, an address element 228, a monitoring element 230, mitigation software 232, and an identifier 234. The monitoring device 206 may be a camera, a video camera, a smartphone, a laptop, a tablet, or any device having the capability to monitor a display.

The communication element 226 may be configured to communicate via any network protocol. For example, the communication element 226 may communicate via wired network protocol (e.g., Ethernet, LAN, etc.). The communication element 226 may have a wireless transceiver configured to send and receive wireless communications via a wireless network (e.g., the network 208). The wireless network may be a Wi-Fi network. The monitoring device 206 may communicate with the display device 204 and/or the computing device 202 via the communication element 226.

The monitoring device 206 may include an address element 228. The address element 228 may comprise or provide an internet protocol address, a network address, a media access control (MAC) address, an Internet address, or the like. The address element 228 may be used to establish a communication session between the computing device 202, the display device 204, the monitoring device 206, and/or other devices and/or networks. The address element 228 may be an identifier or locator of the monitoring device 206. The address element 228 may be persistent for a particular network (e.g., the network 208).

The monitoring element 230 may be any element configured to monitor a display (e.g., the display device 204) for visual effects that may impact the viewer with the condition. The monitoring element 230 may be a camera, a video camera, or any device configured to monitor the display. The monitoring element 230 may create and store a recording (e.g., data) of what the monitoring element 230 is capturing. For example, the monitoring element 230 may be a video camera that generates video content as the monitoring element 230 records. The monitoring element 230 may send (e.g., provide, transmit) the recording to another device (e.g., the computing device 202 and/or the display device 204). The monitoring element 230 may provide the recording to the mitigation software 232 for analysis.

The monitoring element 230 may also be any element configured to monitor audio (e.g., a microphone). The monitoring element 230 may monitor for audio associated with content. The monitoring element 230 may create and store a recording of the audio that the monitoring element 230 is capturing. For example, the monitoring element 230 may be a microphone that captures audio associated content being displayed on a display device. The monitoring element 230 may store capture the audio. The monitoring element 230 may provide the captured audio to the mitigation software 232 for analysis. Additionally, the monitoring element 230 may send (e.g., provide, transmit) the recording to another device (e.g., the computing device 202 and/or the display device 204). The monitoring element 230 may monitor the audio content to determine one or more frequencies that may impact the viewer with the condition. As an example, low frequencies may be associated with traumatic events, such as earthquakes or rock slides, that may impact the viewer with the condition. Also, high frequencies may be associated with traumatic events, such as weapons fire, that may impact the viewer with the condition. If the audio content has a frequency of audio that may impact the viewer with the condition, the monitoring element 230 may filter the audio content to reduce the volume of the frequency of the audio that may impact the viewer with the condition. The monitoring element 230 may only filter out the frequencies that may impact the viewer with the condition, while the remaining audio frequencies are minimally impacted by the filtering. Thus, the monitoring element 230 may reduce the impact that the audio content may have on the viewer with the condition. While modifying audio content was described with reference to the monitoring element 230 for ease of explanation, the computing device 202 and the display device 204 may also modify the content as described above. For example, the mitigation software 216 and the mitigation software 222 may modify the audio content.

The monitoring device 206 may be associated with a user identifier or device identifier 234. The device identifier 234 may be any identifier, token, character, string, or the like, for differentiating one user or monitoring device (e.g., the monitoring device 206) from another user or computing device. For example, the device identifier 234 may be or relate to an Internet Protocol (IP) Address IPV4/IPV6, a media access control address (MAC address), an International Mobile Equipment Identity (IMEI) number, an International Mobile Subscriber Identity (IMSI) number, a phone number, a SIM card number, and/or the like. The device identifier 234 may identify a user or monitoring device as belonging to a particular class of users or monitoring devices. The device identifier 234 may comprise information relating to the monitoring device 206 such as a manufacturer, a model or type of device, a service provider associated with the monitoring device 206, a state of the monitoring device 206, a locator, and/or a label or classifier. Other information may be represented by the device identifier 234.

The monitoring device 206 may be located between the computing device 202 and the display device 204. That is, the monitoring device 206 may monitor a signal sent from the computing device 202 to the display device 204. The monitoring device 206 may monitor the signal for an indication that the signal may impact a viewer with a condition. For example, the signal may be associated with content that the computing device 202 is causing output on the display device 204. The monitoring device 206 may receive the signal and perform signal processing on the signal (e.g., utilizing the mitigation software 232) to determine whether the content may impact the viewer with the condition. If the monitoring device 206 determines that the content may impact the viewer, the monitoring device 206 may take one or more actions to reduce the impact of the content on the viewer with the condition. As an example, if the content is video content with bright lights, the monitoring device 206 may modify the content to reduce the brightness of the content so that the brightness of the lights are reduced. As another example, the monitoring device 206 may instruct the display device 204 to reduce an output brightness of the display device 204.

The monitoring device 206 may receive content from the computing device 202 via a signal and/or a stream that is encrypted or encoded. Thus, the content, as received by the monitoring device 206, may not be in the form that will be presented to the user. Accordingly, the monitoring device 206 may convert and/or decrypt the received content into a form that is representative of what the viewer with the condition may see. Once the monitoring device 206 has converted and/or decrypted the received content into the form that is representative of what the viewer with the condition may see, the monitoring device 206 may then process the content to determine if one or more actions need to be taken to reduce the impact of the content on the viewer with the condition. If the monitoring device 206 determines that the one or more actions needs to be taken, the monitoring device 206 may modify the content accordingly to reduce the impact of the content on the viewer with the condition. The monitoring device 206 may then encode and/or encrypt the modified content. For example, the monitoring device 206 may encode and/or encrypt the modified content based on the encoding and/or the encryption associated with the signal and/or the stream that the monitoring device 206 received. That is, the monitoring device 206 may encode and/or encrypt the modified content so that the modified content is in the same encryption and/or encoding form as the originally received content. The monitoring device 206 may then provide the modified content to the display device 204. In this manner, the monitoring device 206 may be configured to intercept a signal sent from the computing device 202 to the display device 204 to ensure that the content displayed on the display device 204 does not impact the viewer with the condition.

The monitoring device 206 may include mitigation software 232. The mitigation software 232 may include the capabilities of the mitigation software 216 and/or the mitigation software 222. Stated differently, the mitigation software 232 may be configured the same as the mitigation software 216 and/or the mitigation software 222.

While the monitoring device 206 is shown as being a separate device from the computing device 202 and the display device 204 for ease of explanation, the computing device 202 and the display device 204 may incorporate all or some of the capabilities of the monitoring device 206.

Figure 3:
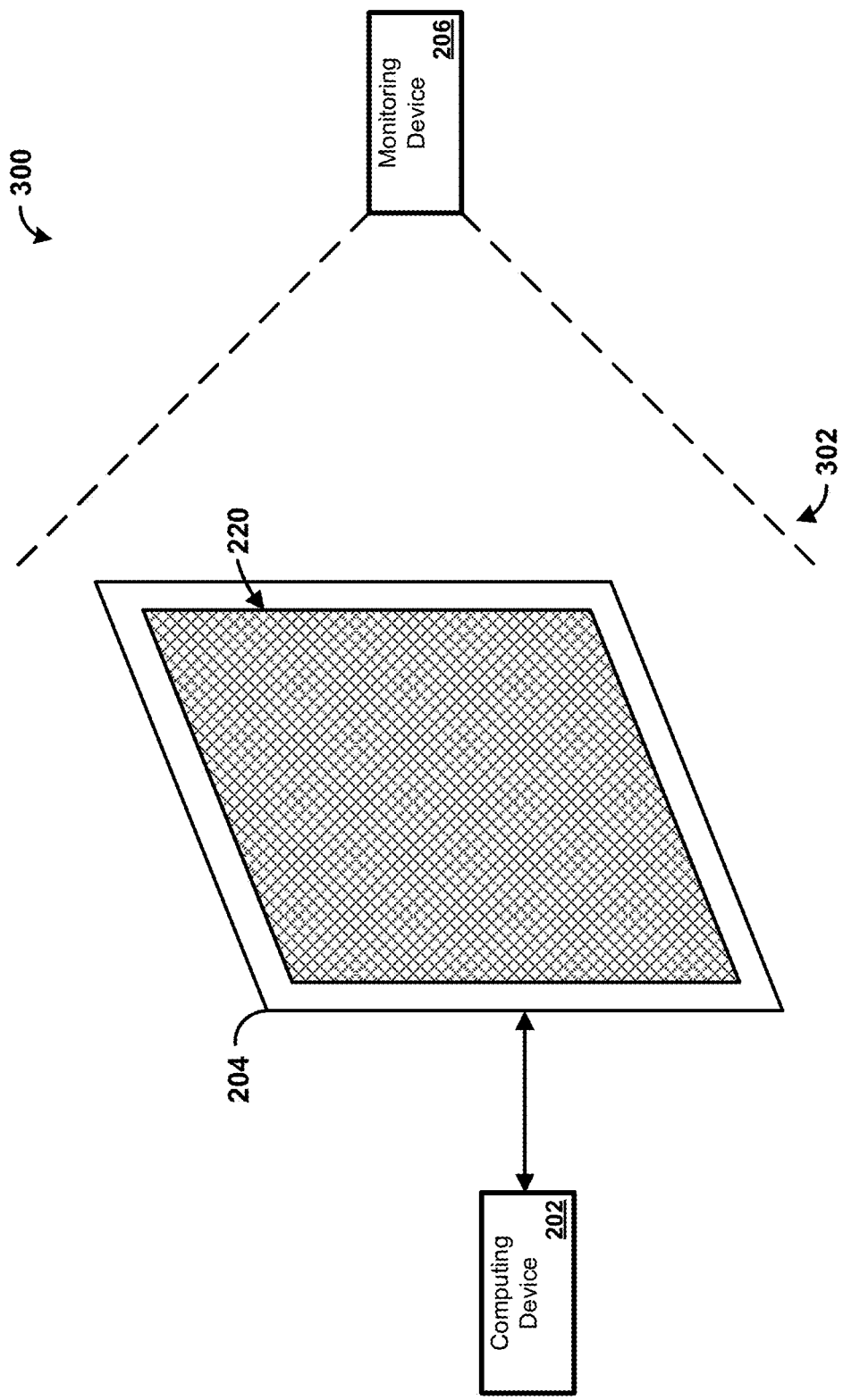
FIG. 3 shows an example system for condition mitigation.

FIG. 3 shows an example system 300 for condition mitigation. Specifically, the system 300 has the computing device 202, the display device 204, and the monitoring device 206 of FIG. 2. The monitoring device 206 may be setup to capture content displayed on the display element 220. The monitoring device 206 may have a range 302 that the monitoring device 206 is configured to capture (e.g., record) the content displayed on the display element 220. While not shown for ease of explanation, the monitoring device 206 may communicate with the computing device 202 and/or the display device 204. The monitoring device 206 may send (e.g., provide, transmit, etc.) the content to the computing device 202 and/or the display device 204. Additionally, the monitoring device 206 may send (e.g., provide, transmit, etc.) data to the computing device 202 and/or the display device 204 that indicates that one or more settings of the display device 204 should be adjusted. For example, the computing device 202 and/or the display device 204 may analyze the recorded content received from the monitoring device 206 and may determine whether actions (e.g., mitigating actions) need to be taken based on the recorded content. For example, the recorded content may have one or more visual effects that may impact a viewer with a condition. The computing device 202 and/or the display device 204 may take one or more actions to reduce the impact of the one or more visual effects on the viewer with the condition.

Figure 4:
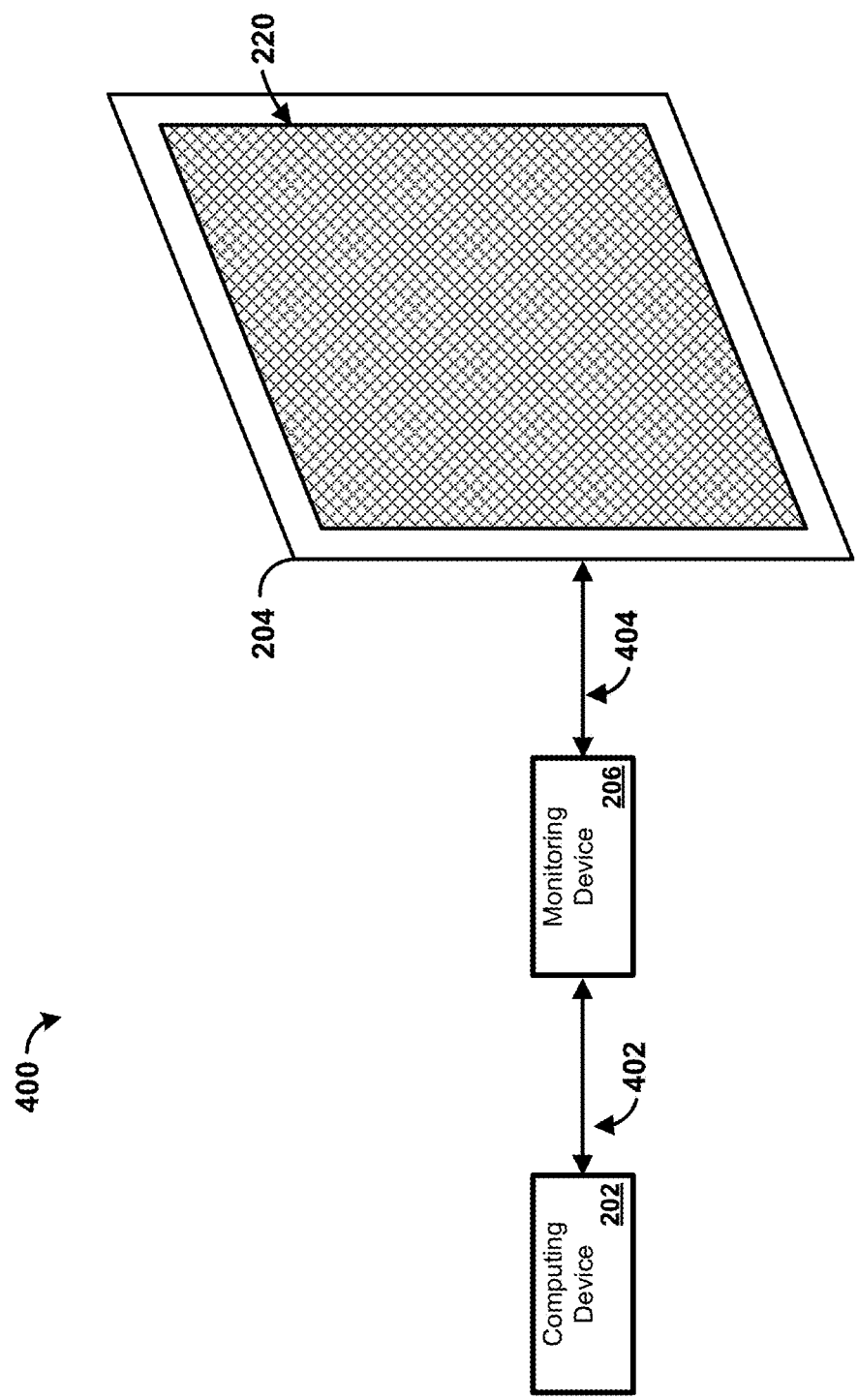
FIG. 4 shows an example system for condition mitigation.

FIG. 4 shows an example system 400 for condition mitigation. Specifically, the system 400 has the computing device 202, the display device 204, and the monitoring device 206 of FIG. 2. The computing device 202 may be coupled to (e.g., in communication with) the monitoring device 206 via a communication link 402. That is, the computing device 202 may send (e.g., transmit, provide, etc.) an output to the monitoring device 206 via the communication link 402, and the monitoring device 206 receives the output via the communication link 402. The monitoring device 206 may be coupled to the display device 204 via a communication link 404. That is, the monitoring device 206 may send (e.g., transmit, provide, etc.) an output to the display device 204 via the communication link 404, and the display device 204 receives the output via the communication link 404. The communication links 402, 404 may be any wired communication link that communicates via any communication standard, such as Digital Visual Interface (DVI), High Definition Multimedia Interface (HDMI), DisplayPort, and so forth.

The monitoring device 206 may monitor any communication (e.g., data, signal, etc.) sent from the computing device 202 via the communication link 402. The monitoring device 206 may monitor the signal for an indication that the signal may impact a viewer with a condition. For example, the signal may be associated with content that the computing device 202 is causing output on the display device 204. The monitoring device 206 may receive the signal and perform signal processing on the signal (e.g., utilizing the mitigation software 232) to determine whether the content may impact the viewer with the condition. If the monitoring device 206 determines that the content may impact the viewer, the monitoring device 206 may take one or more actions to reduce the impact of the content on the viewer with the condition. As an example, if the content is video content with bright lights, the monitoring device 206 may modify the content to reduce the brightness of the content so that the brightness of the lights are reduced. The monitoring device 206 may send the modified content to the display device 204 via the communication link 402. In this manner, the monitoring device 206 has the capability to intercept a signal sent from the computing device 202 to the display device 204 to ensure that the content displayed on the display device 204 does not impact the viewer with the condition.

Figure 5A:
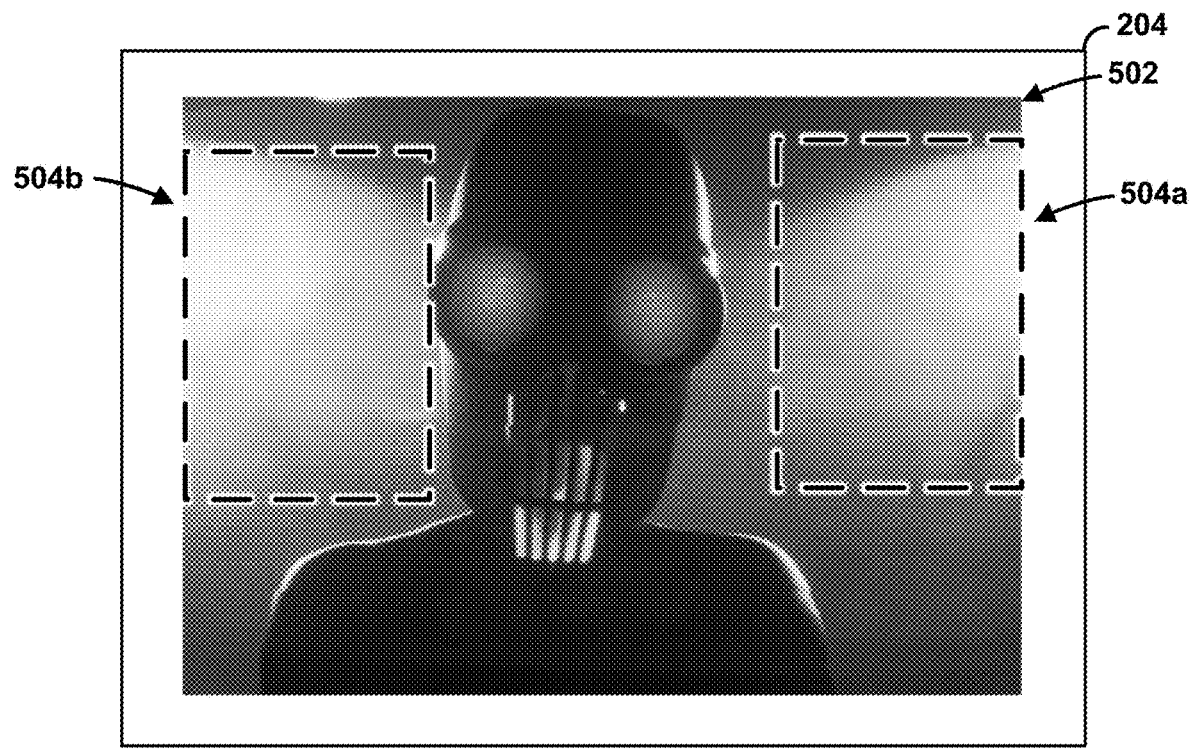
FIGS. 5A-5B show an example of content.
Figure 5B:
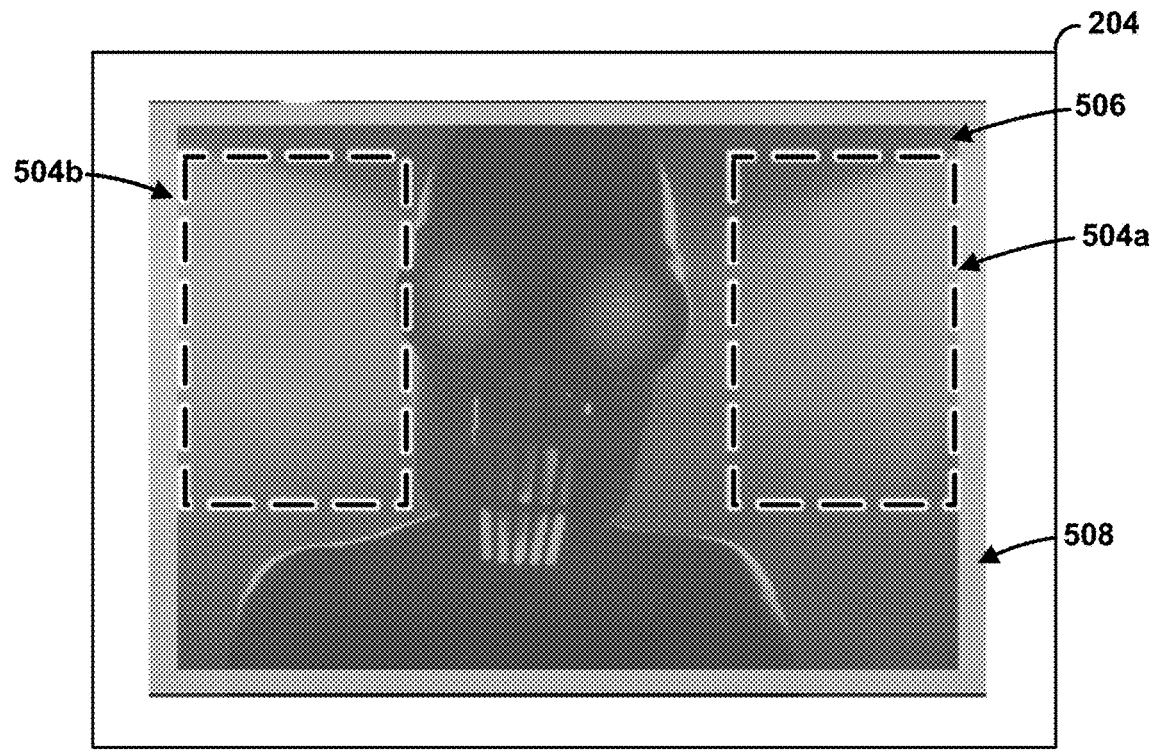

FIGS. 5A-5B show an example of content. Specifically, FIG. 5A shows an example of content 502 being displayed on the display device 204 of FIG. 2. The content 502 may have one or more visual effects. Specifically, the content 502 has two sections of visual effects 504a,b that are highlighted by the checkered boxes.

FIG. 5B shows an example of content 506 being displayed on the display device 204. The content 506 is the same content as the content 502, but the content 506 has been modified as compared to the content 502. Specifically, the content 506 has been modified to reduce the impact of the visual effects 504a,b. Additionally, the content 506 has a border 508 that indicates that the content 506 has been modified as compared to the content 502. The content 506 may be modified by the computing device 202, the display device 204, and/or monitoring device 206 in order to reduce the impact of the visual effects 504a,b on a viewer viewing the content. For example, the content 506 may be modified to reduce the brightness such that the impact of the visual effects 504a,b is reduced. The content 502 may be delayed from being displayed in order to give the device sufficient time to process the content and apply the modifications.

Figure 6A:
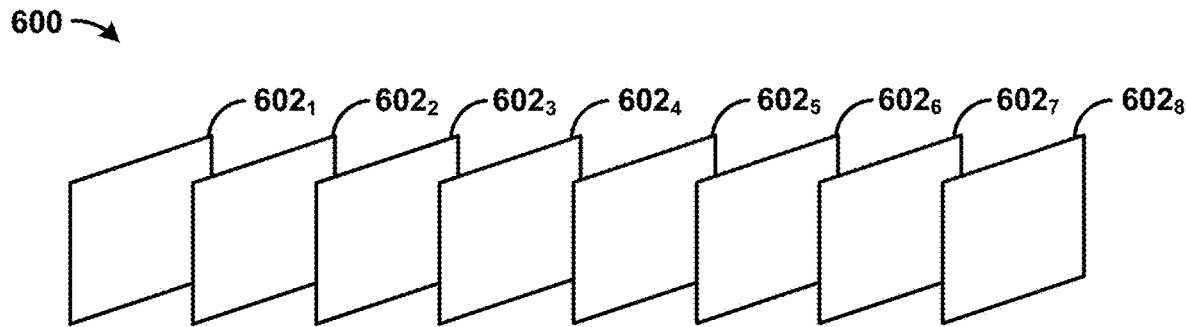
FIGS. 6A-6C show an example of content.
Figure 6B:
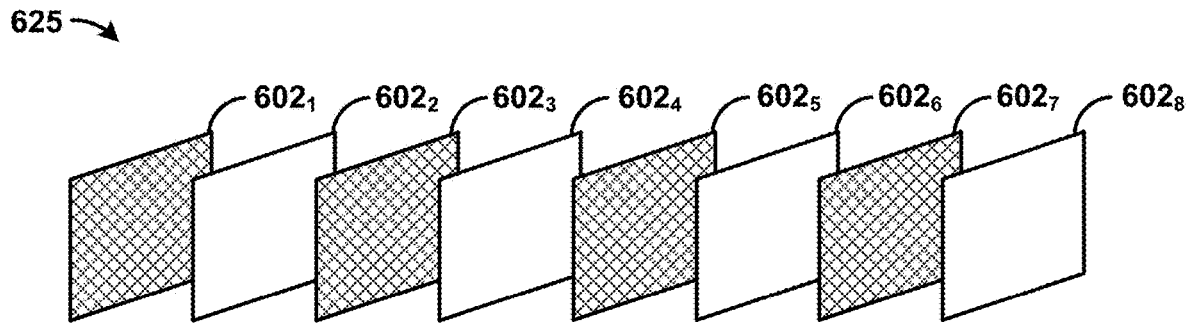
Figure 6C:
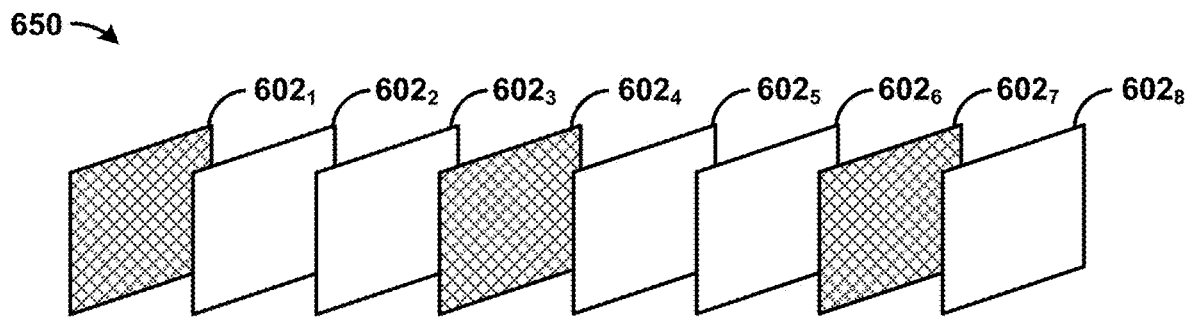

FIGS. 6A-6C show an example of content. FIG. 6A shows an example of content 600 having a plurality of frames 602 of the content 600. Specifically, the content 600 has 8 frames 602. The content 600 may be linear content played from left to right. Stated differently, the frame $602_1$ is displayed first, followed by the frame $602_2$, which is followed by the frame $602_3$, and so forth. When the content 600 is played at a normal playback speed, each of the frames 602 are shown in a sequential order. The frames 602 may have video content, audio content, metadata, or a combination thereof.

A device (e.g., the computing device 202, the display device 204, and/or the monitoring device 206) may analyze each frame relative to the adjacent frames. The device may analyze each frame to determine whether any effect (e.g., visual effect, audio effect) in the frames may impact a viewer with a condition. For example, the device may analyze frame $602_2$ and compare the frame $602_2$ to the frame $602_1$ and the frame $602_3$ to determine if any effects, when played in a sequential order at the normal playback speed, may cause a problem for the viewer with the condition. As an example, the frames $602_1$-$602_3$ may contain a flashing light that goes bright to dim, which may cause a problem for a viewer with the condition. The frame $602_1$ may contain a portion of content that is bright (e.g., relative to the rest of the content, bright on an objective scale, etc.). The same portion of content may be in the frame $602_2$, however, now the portion of content may be dim (e.g., relative to the rest of the content, bright on an objective scale, etc.). The same portion of content may be in the frame $602_3$, but the portion of content is now bright again. The device may determine the flashing light may cause an issue for the viewer with the condition, and the device may modify the content as displayed to reduce the impact to the viewer. The device may delete the frame $602_3$ to reduce the impact of the light. That is, instead of modifying the content to reduce the impact of the visual effect, the content may be modified to remove the frame and/or visual effect. As another example, the device may analyze frame $602_2$ and compare the frame $602_2$ to the frame $602_1$ and the frame $602_3$ to determine if any effects, when played in a sequential order at a slower playback speed (e.g., slow rewind, slow fast forward, slow motion, etc.) may cause a problem for the viewer with the condition. That is, because the frames $602_1$-$602_3$ will be displayed for a longer than normal period of time due to the slower playback speed, the frames may impact the viewer with the condition even if the frames would not have impacted the viewer at the normal playback speed. Accordingly, the device may be configured to take one or more actions to mitigate the impact of the effect at the slower playback speed to reduce the impact to the viewer with the condition.

As a further example, the frames $602_1$-$602_3$ may contain audio at a low frequency that is reproduced at a high volume (e.g., an explosion), which may cause a problem for a viewer with the condition. The frame $602_1$ may contain a portion of content at the low frequency is relatively quiet (e.g., low volume) because the explosion is just beginning in the frame $602_1$. However, the volume of the explosion may be increasing towards the end of the frame $602_1$. The frame $602_2$ may contain the main portion of the explosion. That is, the frame $602_2$ may have the highest volume of the low frequency audio of the frames $602_1$-$602_3$. The frame $602_3$ may contain may contain the tail end of the explosion. That is, the frame $602_3$ may have audio that starts off at a high volume but decreases to a low volume through the frame $602_3$. The device may determine that the explosion in the frames $602_1$-$602_3$ may impact the viewer with the condition. Accordingly, the device may take one or more actions to mitigate the impact of the explosion on the viewer with the condition, such as reducing the volume of the explosion.

FIG. 6B shows an example of content 625 having a plurality of frames 602 of the content 600. The content 625 is the same as content 600. However, the content 625 highlights the frames that may be shown during a trick play operation (e.g., fast forward, fast rewind, slow forward, slow rewind, skip, etc.). For example, the content 625 may indicate the frames 602 played when the content 600 is played at a 2× speed. That is, the frames $602_1$, $602_3$, $602_5$, and $602_7$ are shown as indicated by the hatching. The frames $602_2$, $602_4$, $602_6$, and $602_8$ may not be shown and are skipped during the 2× speed. The device may recognize that at 2× speed, only certain frames 602 are shown. Accordingly, the device can analyze the frames 602 relative to the other frames 602 that will be shown. Stated differently, whereas in FIG. 6A the device analyzed each of the frames 602 relative to each other, only every other frame 602 will be analyzed relative to each other because only every other frame 602 may be displayed at 2× speed. As an example, the device may analyze frame $602_3$ relative to frame $602_1$ and frame $602_5$ to determine whether any visual effects may cause an issue for the viewer at the 2× speed. That is, if the frames $602_1$, $602_3$, $602_5$ now display the flashing light, the device can take one or more actions to reduce the impact of the flashing light. While FIG. 6B is described with reference to visual effects and video content for ease of explanation, a person skilled in the art would appreciate that FIG. 6B is equally applicable to audio effects as described in FIG. 6A.

FIG. 6C shows an example of content 650 having a plurality of frames 602 of the content 600. The content 650 is the same as content 600. However, the content 650 highlights frames that may be shown during a faster trick play operation (e.g., fast forward, fast rewind, slow forward, slow rewind, skip, etc.) as compared to the trick play operation shown in FIG. 6B. For example, the content 650 may indicate the frames 602 played when the content 600 is played at a 3× speed. That is, the frames $602_1$, $602_4$, $602_7$ are shown as indicated by the hatching. The frames $602_2$, $602_3$, $602_5$, $602_6$, and $602_8$ may not be shown and are skipped during the 3× speed. The device may recognize that at 3× speed, only certain frames 602 are shown. Accordingly, the device can analyze the frames 602 relative to the other frames 602 that will be shown. Stated differently, whereas in FIG. 6A the device analyzed each of the frames relative to each other, only every third frame 602 will be analyzed relative to each other because only every third frame 602 may be displayed at 3× speed. As an example, the device may analyze frame $602_4$ relative to frame $602_1$ and frame $602_7$ to determine whether any visual effects may cause an issue for the viewer at the 3× speed. That is, if the frames $602_1$, $602_4$, $602_7$ now display the flashing light, the device can take one or more actions to reduce the impact of the flashing light. Accordingly, the device may be configured to take into account the frames that are shown during trick play operations, and may modify the content based on the frames that are shown. While FIG. 6C is described with reference to visual effects and video content for ease of explanation, a person skilled in the art would appreciate that FIG. 6C is equally applicable to audio effects as described in FIG. 6A.

Figure 7:
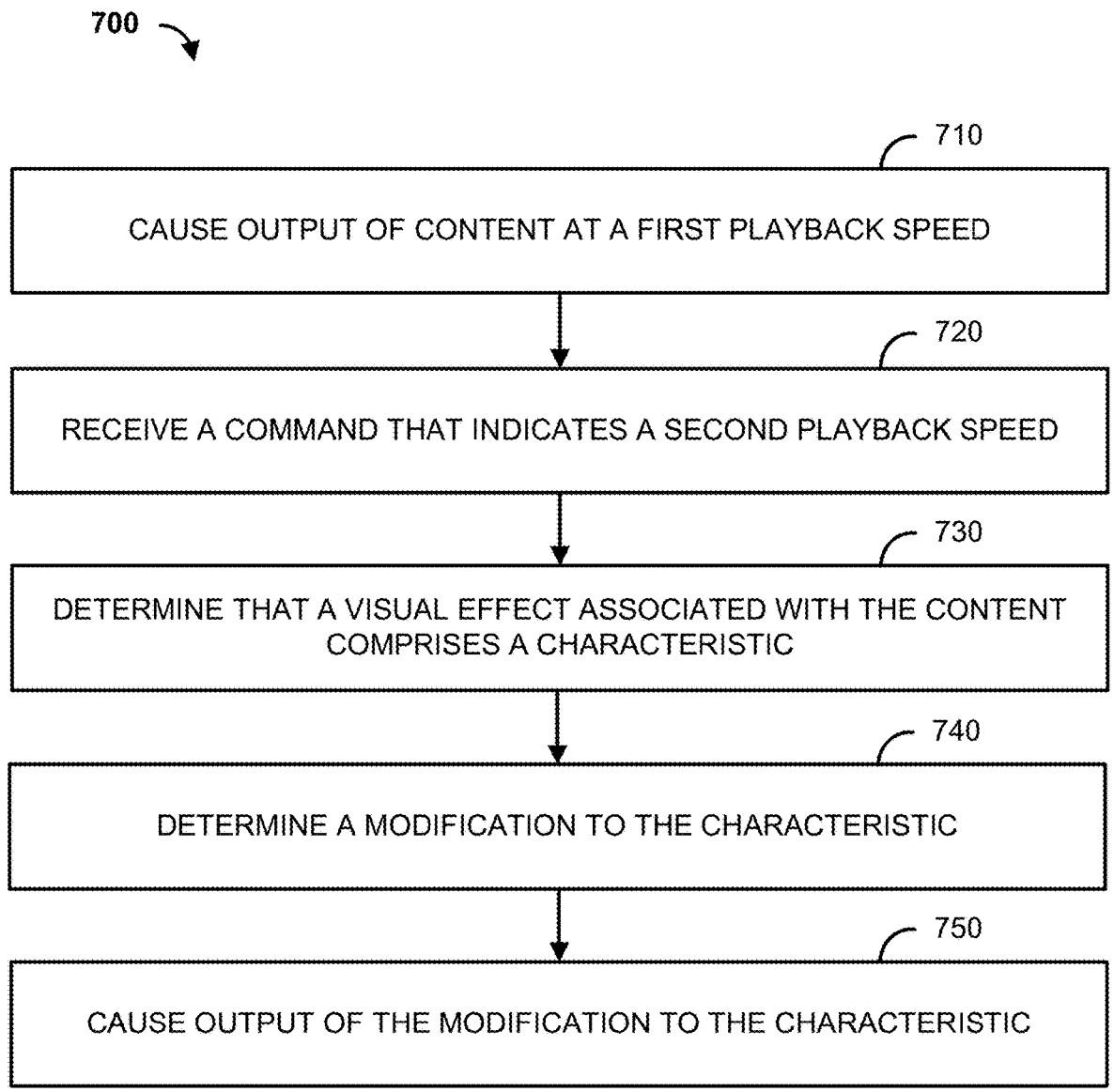
FIG. 7 shows a flowchart of an example method for condition mitigation.

FIG. 7 shows a flowchart of an example method 700 for condition mitigation. At step 710, output of content at a first playback speed may be caused (e.g., by the computing device 202, the display device 204, and/or the monitoring device 206 of FIG. 2). The content may be output (e.g., displayed, etc.) on a display device (e.g., the display device 204). The first playback speed may be a normal playback speed. The content may comprise metadata. The metadata may indicate a visual effect and/or a location of the visual effect within the content. The content may have a plurality of frames.

At step 720, a command that indicates a second playback speed may be received (e.g., by the computing device 202, the display device 204, and/or the monitoring device 206 of FIG. 2). The command may indicate to output the content at the second playback speed. The command may be received from a control device (e.g., a remote control) associated with a user. The second playback speed may be associated with a trick play operation. For example, the second playback speed may be a fast forward operation, a fast rewind operation, a slow forward operation, or a slow rewind operation. Additionally, the second playback speed may be a slow forward operation or a slow rewind operation, such as a slow motion playback speed. The second playback speed may cause the content to be presented at a faster rate than the normal playback speed.

At step 730, a visual effect associated with the content that comprises a characteristic may be determined (e.g., by the computing device 202, the display device 204, and/or the monitoring device 206 of FIG. 2). The characteristic may impact a viewer with a condition. The characteristic may comprise at least one of a contrast, a color, and/or a brightness. Determining that the visual effect associated with the content comprises the characteristic may be determined based on the second playback speed. Determining that the visual effect associated with the content comprises the characteristic may comprise determining a change in brightness between frames of the content at the second playback speed. The visual effect may be one or more of a change in image contrast, a change in image patterns, a change in brightness, or a specific color. For example, the content, when played at the second playback speed, may cause the visual effect comprising the characteristic to impact the viewer with the condition. As an example, a threshold may indicate that displaying the visual effect at the second playback speed may cause a seizure to the viewer with the condition. The device may receive, from a monitoring device (e.g., the monitoring device 206 of FIG. 2), an indication that the visual effect associated with the content comprises the characteristic.

At step 740, a modification to the characteristic may be determined (e.g., by the computing device 202, the display device 204, and/or the monitoring device 206 of FIG. 2). The characteristic (e.g., the content) may be modified to reduce the impact of the visual effect. For example, the brightness may be reduced by a certain amount in order to reduce the impact of the visual effect such that the visual effect within the content no longer satisfies the threshold. As another example, a contrast of the content may be reduced in order to reduce the impact of the visual effect such that the visual effect within the content no longer satisfies the threshold. As a further example, a color scale of the content may be modified (e.g., tinted) to reduce the impact of the visual effect. As an example, the content may be modified from color to grayscale, or the content may be modified to reduce an amount of red color within the content.

At step 750, output of the modification to the characteristic may be caused (e.g., by the computing device 202, the display device 204, and/or the monitoring device 206 of FIG. 2). For example, the content may be modified based on the modification, and the modified content may be output (e.g., displayed) on a display device (e.g., the display device 204). The modification to the characteristic may displayed at the second playback speed.

Figure 8:
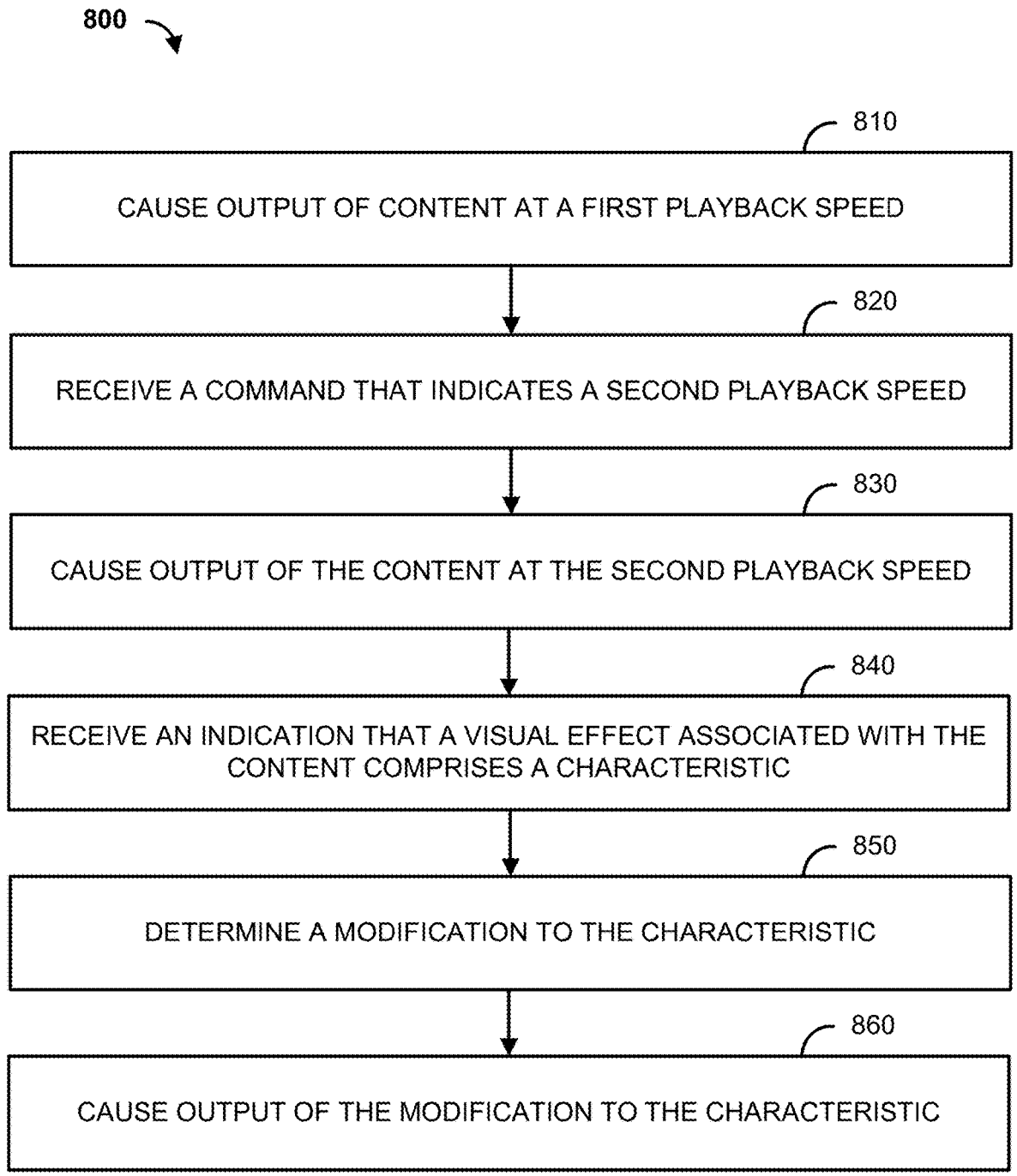
FIG. 8 shows a flowchart of an example method for condition mitigation.

FIG. 8 shows a flowchart of an example method 800 for condition mitigation. At step 810, output of content at a first playback speed may be caused (e.g., by the computing device 202, the display device 204, and/or the monitoring device 206 of FIG. 2). The content may be output (e.g., displayed, etc.) on a display device (e.g., the display device 204). The first playback speed may be a normal playback speed. The content may comprise metadata. The metadata may indicate a visual effect and/or a location of the visual effect within the content. The content may have a plurality of frames.

At step 820, a command that indicates a second playback speed may be received (e.g., by the computing device 202, the display device 204, and/or the monitoring device 206 of FIG. 2). The command may indicate to output the content at the second playback speed. The command may be received from a control device (e.g., a remote control) associated with a user. The second playback speed may be associated with a trick play operation. For example, the second playback speed may be a fast forward operation, a fast rewind operation, a slow forward operation, or a slow rewind operation. The second playback speed may cause the content to be presented at a faster rate than the normal playback speed.

At step 830, output of content at a second playback speed may be caused (e.g., by the computing device 202, the display device 204, and/or the monitoring device 206 of FIG. 2). The content may be output (e.g., displayed) on a display device (e.g., the display device 204).

At step 840, an indication that a visual effect associated with the content comprises a characteristic may be received (e.g., by the computing device 202 and/or the display device 204 of FIG. 2). The characteristic may impact a viewer with a condition. The characteristic may comprise at least one of a contrast, a color, and/or a brightness. The indication may be received from a monitoring device (e.g., the monitoring device 206 of FIG. 2). The visual effect may be one or more a change in image contrast, a change in image patterns, a change in brightness, or a specific color. For example, the content, when played at the second playback speed, may cause the visual effect to impact the viewer with the condition. As an example, the threshold may indicate that causing output (e.g., displaying, etc.) the visual effect at the second playback speed may cause a seizure to the viewer with the condition. The device may receive, from a monitoring device (e.g., the monitoring device 206 of FIG. 2), an indication that the visual effect associated with the content comprises the characteristic.

At step 850, a modification to the characteristic may be determined (e.g., by the computing device 202, the display device 204, and/or the monitoring device 206 of FIG. 2). The characteristic (e.g., the content) may be modified to reduce the impact of the visual effect. For example, the brightness may be reduced by a certain amount in order to reduce the impact of the visual effect such that the visual effect within the content no longer satisfies the threshold. As another example, a contrast of the content may be reduced in order to reduce the impact of the visual effect such that the visual effect within the content no longer satisfies the threshold. As a further example, a color scale of the content may be modified (e.g., tinted) to reduce the impact of the visual effect. As an example, the content may be modified from color to grayscale, or the content may be modified to reduce an amount of red color within the content.

At step 860, output of the modification to the characteristic may be caused (e.g., by the computing device 202, the display device 204, and/or the monitoring device 206 of FIG. 2). For example, the content may be modified based on the modification, and the modified content may be output (e.g., displayed) on a display device (e.g., the display device 204). The modification to the characteristic may displayed at the second playback speed.

Figure 9:
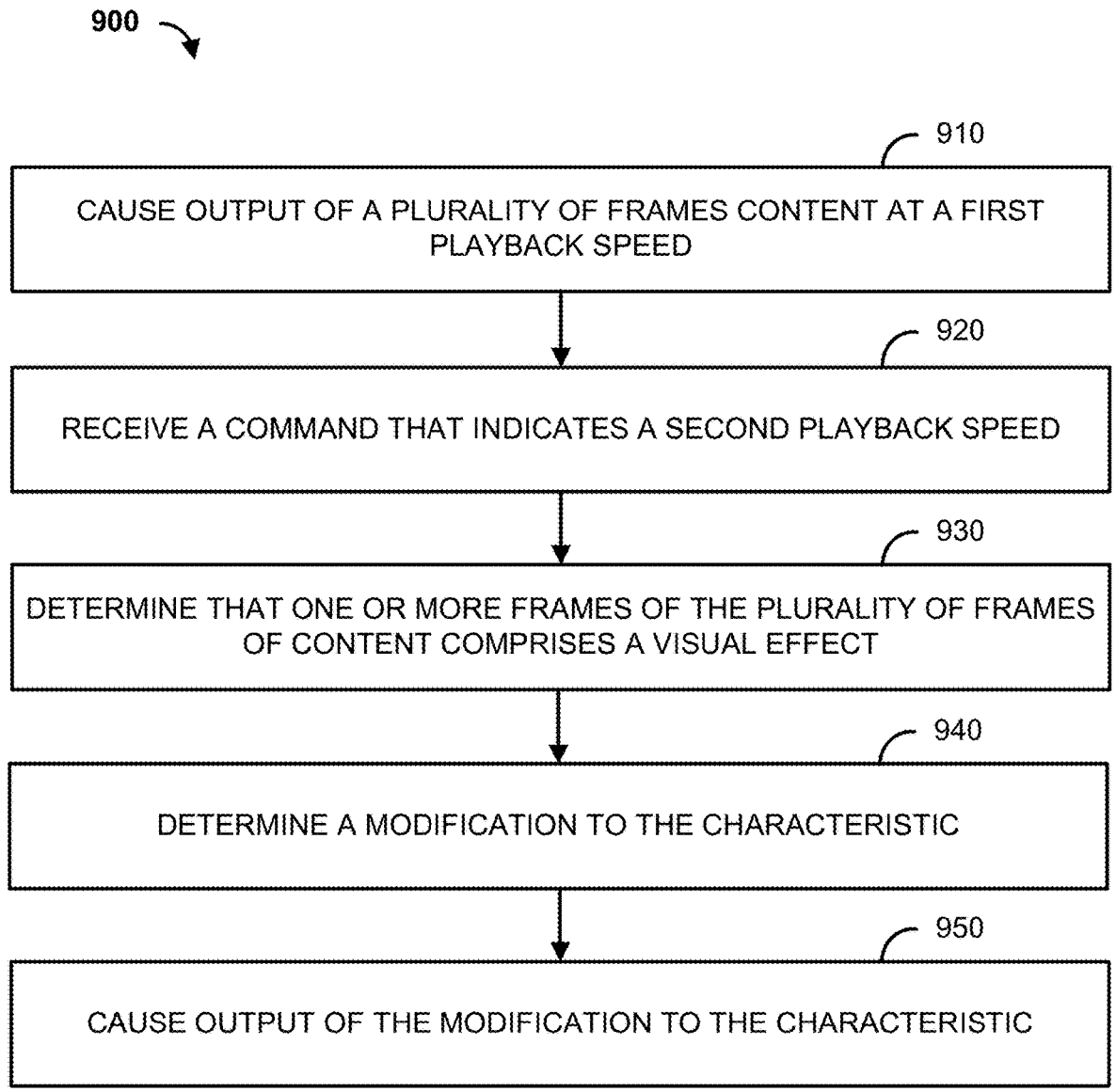
FIG. 9 shows a flowchart of an example method for condition mitigation.

FIG. 9 shows a flowchart of an example method 900 for condition mitigation. At step 910, output of a plurality of frames of content at a first playback speed may be caused (e.g., by the computing device 202, the display device 204, and/or the monitoring device 206 of FIG. 2). The content may be output (e.g., displayed, etc.) on a display device (e.g., the display device 204). The first playback speed may be a normal playback speed. The content may comprise metadata. The metadata may indicate a visual effect and/or a location of the visual effect within the content. The content may have a plurality of frames. The plurality of frames may be displayed at the first playback speed.

At step 920, a command that indicates a second playback speed may be received (e.g., by the computing device 202, the display device 204, and/or the monitoring device 206 of FIG. 2). The command may indicate to output the content at the second playback speed. The command may be received from a control device (e.g., a remote control) associated with a user. The second playback speed may be associated with a trick play operation. For example, the second playback speed may be a fast forward operation, a fast rewind operation, a slow forward operation, or a slow rewind operation. The second playback speed may cause the content to be presented at a faster rate than the normal playback speed.

At step 930, one or more frames of the plurality of frames of content comprises a visual effect that comprise a characteristic may be determined (e.g., by the computing device 202, the display device 204, and/or the monitoring device 206 of FIG. 2). The characteristic may impact a viewer with a condition. The characteristic may comprise at least one of a contrast, a color, and/or a brightness. Determining that the visual effect comprises the characteristic may be determined based on the second playback speed. Determining that the visual effect comprises the characteristic may comprise determining a change in brightness between the frames of the content at the second playback speed. The visual effect may be one or more of a change in image contrast, a change in image patterns, a change in brightness, or a specific color. For example, the content, when played at the second playback speed, may cause the visual effect to impact a viewer with a condition. As an example, a threshold may indicate that displaying the visual effect at the second playback speed may cause a seizure to the viewer with the condition. The device may receive, from a monitoring device (e.g., the monitoring device 206 of FIG. 2), an indication that the visual effect comprises the characteristic.

At step 940, a characteristic of the one or more frames of the plurality of frames of content may be modified (e.g., by the computing device 202, the display device 204, and/or the monitoring device 206 of FIG. 2). The characteristic (e.g., the content) may be modified to reduce the impact of the visual effect. For example, the brightness may be reduced by a certain amount in order to reduce the impact of the visual effect such that the visual effect within the content no longer satisfies the threshold. As another example, a contrast of the content may be reduced in order to reduce the impact of the visual effect such that the visual effect within the content no longer satisfies the threshold. As a further example, a color scale of the content may be modified (e.g., tinted) to reduce the impact of the visual effect. As an example, the content may be modified from color to grayscale, or the content may be modified to reduce an amount of red color within the content.

At step 950, output of the modification to the characteristic may be caused (e.g., by the computing device 202, the display device 204, and/or the monitoring device 206 of FIG. 2). For example, the content may be modified based on the modification, and the modified content may be output (e.g., displayed) on a display device (e.g., the display device 204). The modification to the characteristic may displayed at the second playback speed.

Figure 10:
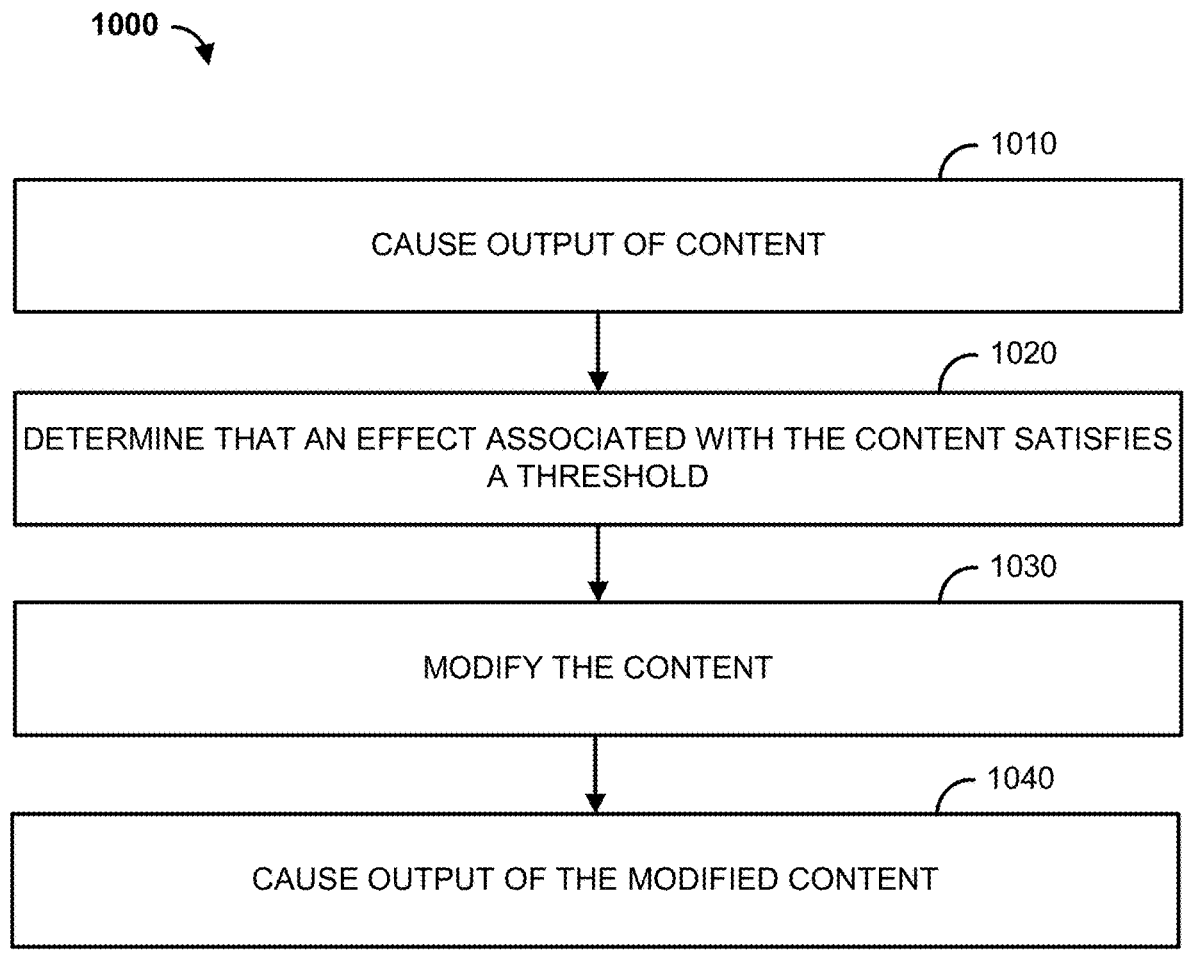
FIG. 10 shows a flowchart of an example method for condition mitigation.

FIG. 10 shows a flowchart of an example method 1000 for condition mitigation. At step 1010, output of content may be caused (e.g., by the computing device 202, the display device 204, and/or the monitoring device 206 of FIG. 2). The content may be video content that is output (e.g., displayed, etc.) on a display device (e.g., the display device 204). The content may be audio content that is output via one or more speakers. For example, the content may be output on one or more speakers of the display device 204, a speaker system, and so forth. The content may comprise metadata. The metadata may indicate an effect within the content. For example, the metadata may indicate an audio effect that may impact a listener with a condition. The content may have a plurality of frames.

At step 1020, an effect associated with the content satisfying a threshold may be determined by a device (e.g., by the computing device 202, the display device 204, and/or the monitoring device 206 of FIG. 2). The effect may be an audio effect and/or a visual effect. The effect may have a characteristic that satisfies the threshold. The characteristic may comprise at least one of contrast, color, brightness, volume, frequency, and/or intensity. The effect associated with the content satisfying the threshold may indicate that the effect may impact a person with a condition. For example, the effect may be an explosion associated with the content, and the explosion may impact a person with PTSD. The device may receive, from a monitoring device (e.g., the monitoring device 206 of FIG. 2), an indication that the effect associated with the content satisfies the threshold.

At step 1030, a characteristic of the content may be modified (e.g., by the computing device 202, the display device 204, and/or the monitoring device 206 of FIG. 2). The content may be modified to reduce the impact of the effect. For example, if the effect is an explosion, a volume associated with the explosion may be modified. As an example, the volume of the explosion may be reduced so that the explosion is not as loud when output or the content may be modified to reduce an amount of red color within the content. As another example, the audio content may be monitored to determine one or more frequencies that may impact the viewer with the condition. As an example, low frequencies may be associated with traumatic events, such as earthquakes or rock slides, that may impact the viewer with the condition. Also, high frequencies may be associated with traumatic events, such as weapons fire, that may impact the viewer with the condition. If the audio content has a frequency of audio that may impact the viewer with the condition, the audio content may be filtered to reduce the volume of the frequency of the audio that may impact the viewer with the condition. The filtering may only filter out the frequencies that may impact the viewer with the condition, while the remaining audio frequencies are minimally impacted by the filtering.

At step 1040, output of the modified content may be caused (e.g., by the computing device 202, the display device 204, and/or the monitoring device 206 of FIG. 2). The modified content may be audio content that is output via one or more speakers. For example, the content may be output on one or more speakers of the display device 204, a speaker system, and so forth.

Figure 11:
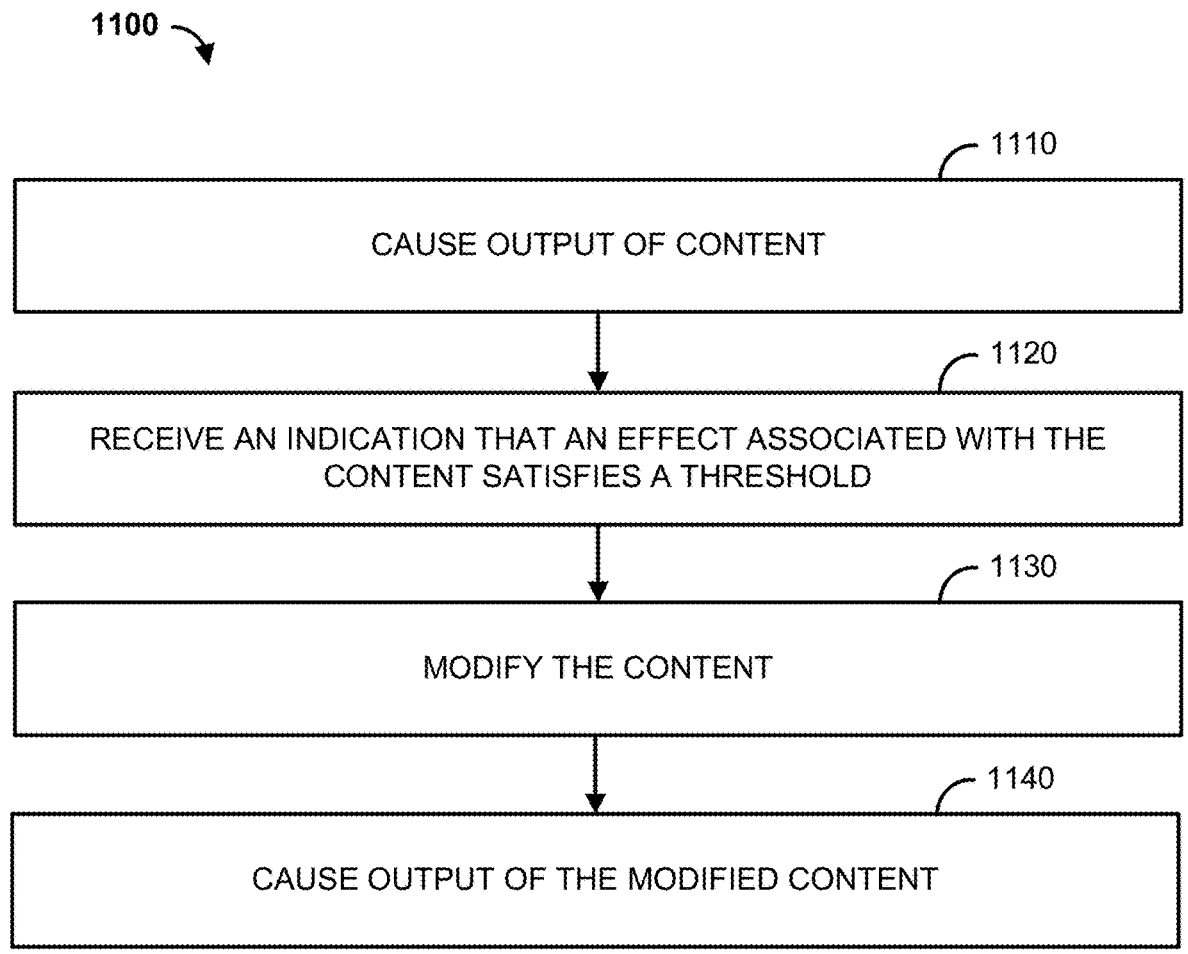
FIG. 11 shows a flowchart of an example method for condition mitigation.

FIG. 11 shows a flowchart of an example method 1100 for condition mitigation. At step 1110, output of content may be caused (e.g., by the computing device 202, the display device 204, and/or the monitoring device 206 of FIG. 2). The content may be video content that is output (e.g., displayed, etc.) on a display device (e.g., the display device 204). The content may be audio content that is output via one or more speakers. For example, the content may be output on one or more speakers of the display device 204, a speaker system, and so forth. The content may comprise metadata. The metadata may indicate an effect within the content. For example, the metadata may indicate an audio effect that may impact a listener with a condition. The content may have a plurality of frames.

At step 1120, an indication that an effect associated with the content satisfies a threshold may be received (e.g., by the computing device 202 and/or the display device 204 of FIG. 2). The indication may be received from a monitoring device (e.g., the monitoring device 206 of FIG. 2). The effect may have a characteristic that satisfies the threshold. The characteristic may comprise at least one of contrast, color, brightness, volume, frequency, and/or intensity. The effect may be an audio effect and/or a visual effect. The effect associated with the content satisfying the threshold may indicate that the effect may impact a person with a condition. For example, the effect may be an explosion associated with the content, and the explosion may impact a person with PTSD. The device may receive, from a monitoring device (e.g., the monitoring device 206 of FIG. 2), an indication that the effect associated with the content satisfies the threshold.

At step 1130, a characteristic of the content may be modified (e.g., by the computing device 202, the display device 204, and/or the monitoring device 206 of FIG. 2). The content may be modified to reduce the impact of the effect. For example, if the effect is an explosion, a volume associated with the explosion may be modified. As an example, the volume of the explosion may be reduced so that the explosion is not as loud when output or the content may be modified to reduce an amount of red color within the content. As another example, the audio content may be monitored to determine one or more frequencies that may impact the viewer with the condition. As an example, low frequencies may be associated with traumatic events, such as earthquakes or rock slides, that may impact the viewer with the condition. Also, high frequencies may be associated with traumatic events, such as weapons fire, that may impact the viewer with the condition. If the audio content has a frequency of audio that may impact the viewer with the condition, the audio content may be filtered to reduce the volume of the frequency of the audio that may impact the viewer with the condition. The filtering may only filter out the frequencies that may impact the viewer with the condition, while the remaining audio frequencies are minimally impacted by the filtering.

At step 1140, display of the modified content may be caused (e.g., by the computing device 202, the display device 204, and/or the monitoring device 206 of FIG. 2). The modified content may be audio content that is output via one or more speakers. For example, the content may be output on one or more speakers of the display device 204, a speaker system, and so forth.

Figure 12:
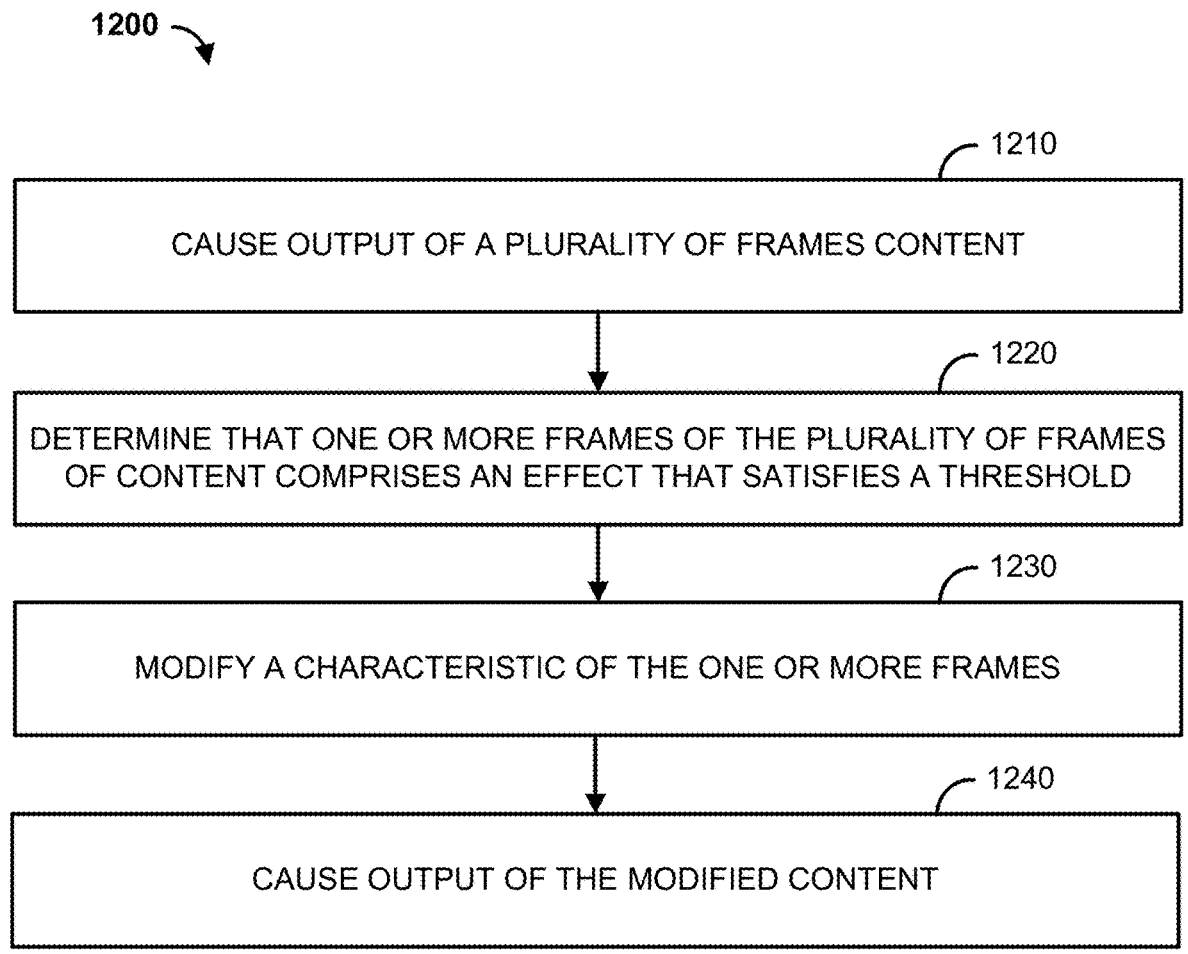
FIG. 12 shows a flowchart of an example method for condition mitigation.

FIG. 12 shows a flowchart of an example method 1200 for condition mitigation. At step 1210, output of a plurality of frames of content may be caused (e.g., by the computing device 202, the display device 204, and/or the monitoring device 206 of FIG. 2). The content may be video content that is output (e.g., displayed, etc.) on a display device (e.g., the display device 204). The content may be audio content that is output via one or more speakers. For example, the content may be output on one or more speakers of the display device 204, a speaker system, and so forth. The content may comprise metadata. The metadata may indicate an effect within the content. For example, the metadata may indicate an audio effect that may impact a listener with a condition. The content may have a plurality of frames.

At step 1220, one or more frames of the plurality of frames of content comprises an effect that satisfies a threshold may be determined (e.g., by the computing device 202, the display device 204, and/or the monitoring device 206 of FIG. 2). The effect may be an audio effect and/or a visual effect. The effect may have a characteristic that satisfies the threshold. The characteristic may comprise at least one of contrast, color, brightness, volume, frequency, and/or intensity. The effect associated with the content satisfying the threshold may indicate that the effect may impact a person with a condition. For example, the effect may be an explosion associated with the content, and the explosion may impact a person with PTSD. The device may receive, from a monitoring device (e.g., the monitoring device 206 of FIG. 2), an indication that the effect associated with the content satisfies the threshold At step 1230, a characteristic of one or more frames of the content may be modified (e.g., by the computing device 202, the display device 204, and/or the monitoring device 206 of FIG. 2). The content may be modified to reduce the impact of the effect. For example, if the effect is an explosion, a volume associated with the explosion may be modified. As an example, the volume of the explosion may be reduced so that the explosion is not as loud when output or the content may be modified to reduce an amount of red color within the content. As another example, the audio content may be monitored to determine one or more frequencies that may impact the viewer with the condition. As an example, low frequencies may be associated with traumatic events, such as earthquakes or rock slides, that may impact the viewer with the condition. Also, high frequencies may be associated with traumatic events, such as weapons fire, that may impact the viewer with the condition. If the audio content has a frequency of audio that may impact the viewer with the condition, the audio content may be filtered to reduce the volume of the frequency of the audio that may impact the viewer with the condition. The filtering may only filter out the frequencies that may impact the viewer with the condition, while the remaining audio frequencies are minimally impacted by the filtering.

At step 1240, output of the modified content may be caused (e.g., by the computing device 202, the display device 204, and/or the monitoring device 206 of FIG. 2). One or more frames of the modified content may be output. The modified content may be audio content that is output via one or more speakers. For example, the content may be output on one or more speakers of the display device 204, a speaker system, and so forth.

Figure 13:
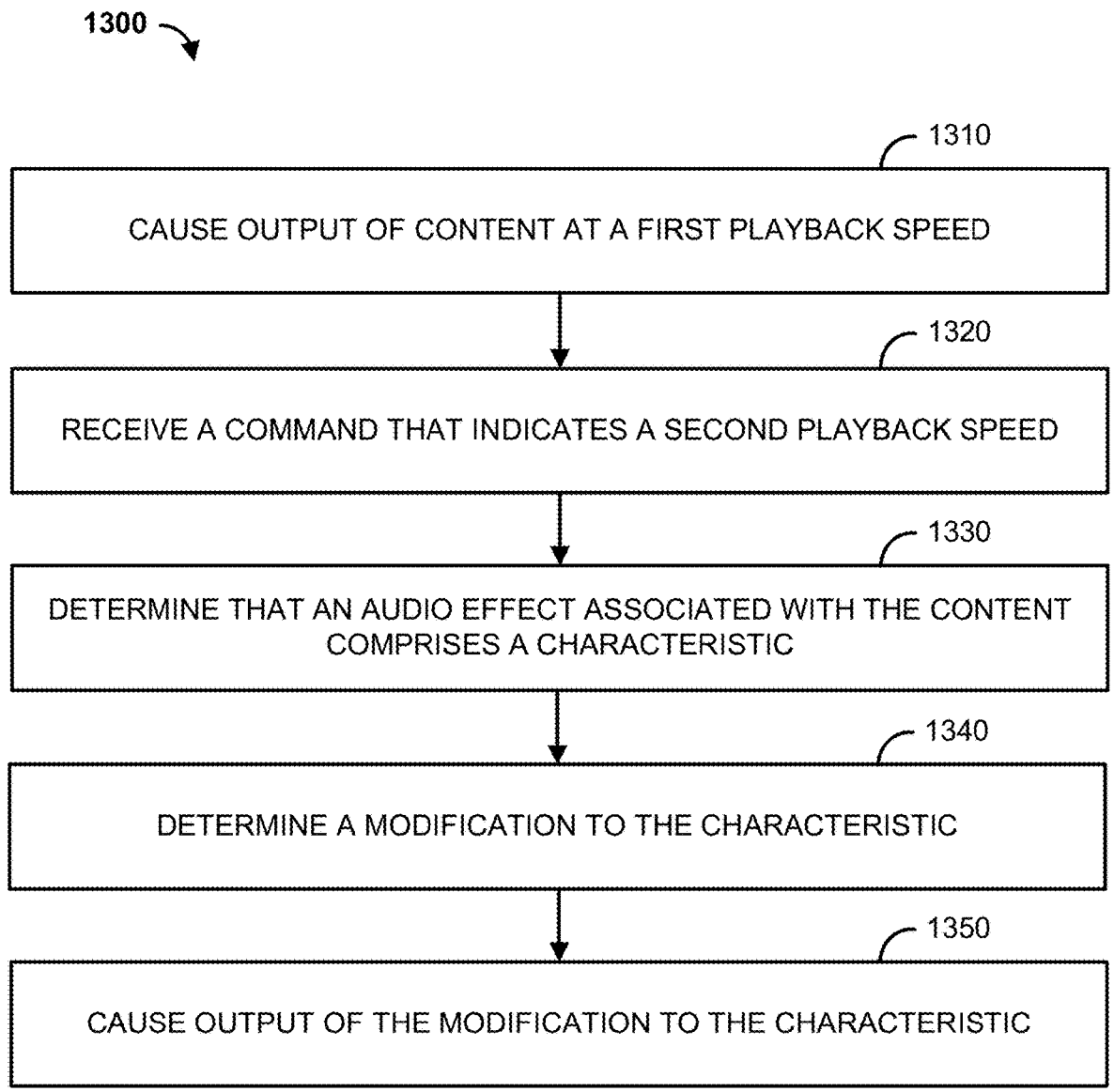
FIG. 13 shows a flowchart of an example method for condition mitigation.

FIG. 13 shows a flowchart of an example method 1300 for condition mitigation. At step 1310, output of content at a first playback speed may be caused (e.g., by the computing device 202, the display device 204, and/or the monitoring device 206 of FIG. 2). The content may be audio content that is output via a display device (e.g., the display device 204) and/or an audio output device (e.g., a speaker). The first playback speed may be a normal playback speed. The content may comprise metadata. The metadata may indicate an audio effect and/or a volume of the audio effect within the content. The content may have a plurality of frames.

At step 1320, a command that indicates a second playback speed may be received (e.g., by the computing device 202, the display device 204, and/or the monitoring device 206 of FIG. 2). The command may indicate to output the content at the second playback speed. The command may be received from a control device (e.g., a remote control) associated with a user. The second playback speed may be associated with a trick play operation. For example, the second playback speed may be a fast forward operation, a fast rewind operation, a slow forward operation, or a slow rewind operation. Additionally, the second playback speed may be a slow forward operation or a slow rewind operation, such as a slow motion playback speed. The second playback speed may cause the content to be presented at a faster rate or a slower rate than the normal playback speed.

At step 1330, an audio effect associated with the content that comprises a characteristic may be determined (e.g., by the computing device 202, the display device 204, and/or the monitoring device 206 of FIG. 2). The characteristic may impact a viewer with a condition. Determining that the audio effect associated with the content comprises the characteristic may comprise determining a change in volume and/or an audio frequency between frames of the content at the second playback speed. The audio effect may be one or more of a loud sound (e.g., a gunshot, an explosion) or an audio frequency that may impact a viewer with a condition. The characteristic may comprise at least one of a volume, a frequency, or an intensity of the audio. For example, the content, when played at the second playback speed, may cause the audio effect to impact the viewer with the condition. As an example, a threshold may indicate that causing output of the audio effect at the second playback speed may impact the viewer with the condition. The device may receive, from a monitoring device (e.g., the monitoring device 206 of FIG. 2), an indication that the audio effect associated with the content comprises the characteristic.

At step 1340, a modification to the characteristic may be determined (e.g., by the computing device 202, the display device 204, and/or the monitoring device 206 of FIG. 2). The characteristic (e.g., the content) may be modified to reduce the impact of the audio effect. For example, the volume of the content may be reduced by a certain amount in order to reduce the impact of the audio effect such that the audio effect within the content no longer satisfies the threshold. As another example, an audio frequency may be filtered or a volume associated with the audio frequency may be reduced in order to reduce the impact of the audio effect such that the audio effect within the content no longer satisfies the threshold.

At step 1350, output of the modification to the characteristic may be caused (e.g., by the computing device 202, the display device 204, and/or the monitoring device 206 of FIG. 2). For example, the content may be modified based on the modification, and the modified content may be output (e.g., displayed) on a display device (e.g., the display device 204). The modified content may be audio content that is output via a display device (e.g., the display device 204) and/or an audio output device (e.g., a speaker). The modified content may output at the second playback speed.

Figure 14:
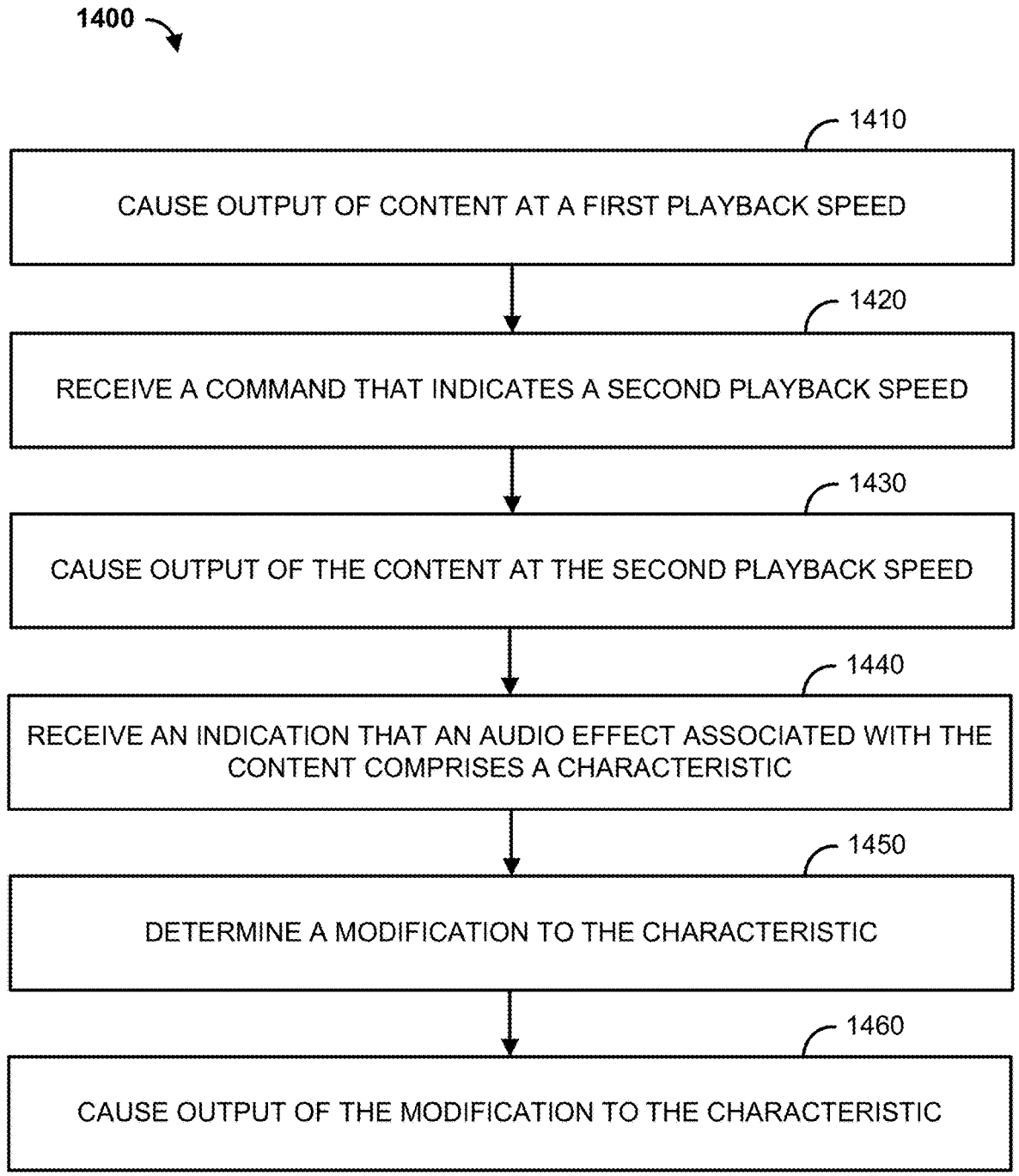
FIG. 14 shows a flowchart of an example method for condition mitigation.

FIG. 14 shows a flowchart of an example method 1400 for condition mitigation.

At step 1410, output of content at a first playback speed may be caused (e.g., by the computing device 202, the display device 204, and/or the monitoring device 206 of FIG. 2). The content may be audio content that is output via a display device (e.g., the display device 204) and/or an audio output device (e.g., a speaker). The first playback speed may be a normal playback speed. The content may comprise metadata. The metadata may indicate an audio effect and/or a volume of the audio effect within the content. The content may have a plurality of frames.

At step 1420, a command that indicates a second playback speed may be received (e.g., by the computing device 202, the display device 204, and/or the monitoring device 206 of FIG. 2). The command may indicate to output the content at the second playback speed. The command may be received from a control device (e.g., a remote control) associated with a user. The second playback speed may be associated with a trick play operation. For example, the second playback speed may be a fast forward operation, a fast rewind operation, a slow forward operation, or a slow rewind operation. The second playback speed may cause the content to be presented at a faster rate or at a slower rate than the normal playback speed.

At step 1430, output of content at a second playback speed may be caused (e.g., by the computing device 202, the display device 204, and/or the monitoring device 206 of FIG. 2). The content may be audio content that is output via a display device (e.g., the display device 204) and/or an audio output device (e.g., a speaker).

At step 1440, an indication that an audio effect associated with the content comprises a characteristic may be received (e.g., by the computing device 202 and/or the display device 204 of FIG. 2). The indication may be received from a monitoring device (e.g., the monitoring device 206 of FIG. 2). The audio effect may be one or more of a loud sound (e.g., a gunshot, an explosion) or an audio frequency that may impact a viewer with a condition. The characteristic may comprise at least one of a volume, a frequency, or an intensity of the audio. For example, the content, when played at the second playback speed, may cause the audio effect to impact the viewer with the condition. As an example, a threshold may indicate that causing output of the audio effect at the second playback speed may impact the viewer with the condition. The device may receive, from a monitoring device (e.g., the monitoring device 206 of FIG. 2), an indication that the audio effect associated with the content comprises the characteristic.

At step 1450, a modification to the characteristic may be determined (e.g., by the computing device 202, the display device 204, and/or the monitoring device 206 of FIG. 2). The characteristic (e.g., the content) may be modified to reduce the impact of the audio effect. For example, the volume of the content may be reduced by a certain amount in order to reduce the impact of the audio effect such that the audio effect within the content no longer satisfies the threshold. As another example, an audio frequency may be filtered or a volume associated with the audio frequency may be reduced in order to reduce the impact of the audio effect such that the audio effect within the content no longer satisfies the threshold.

At step 1460, output of the modification to the characteristic may be caused (e.g., by the computing device 202, the display device 204, and/or the monitoring device 206 of FIG. 2). For example, the content may be modified based on the modification, and the modified content may be output (e.g., displayed) on a display device (e.g., the display device 204). The modified content may be audio content that is output via a display device (e.g., the display device 204) and/or an audio output device (e.g., a speaker). The modified content may output at the second playback speed.

Figure 15:
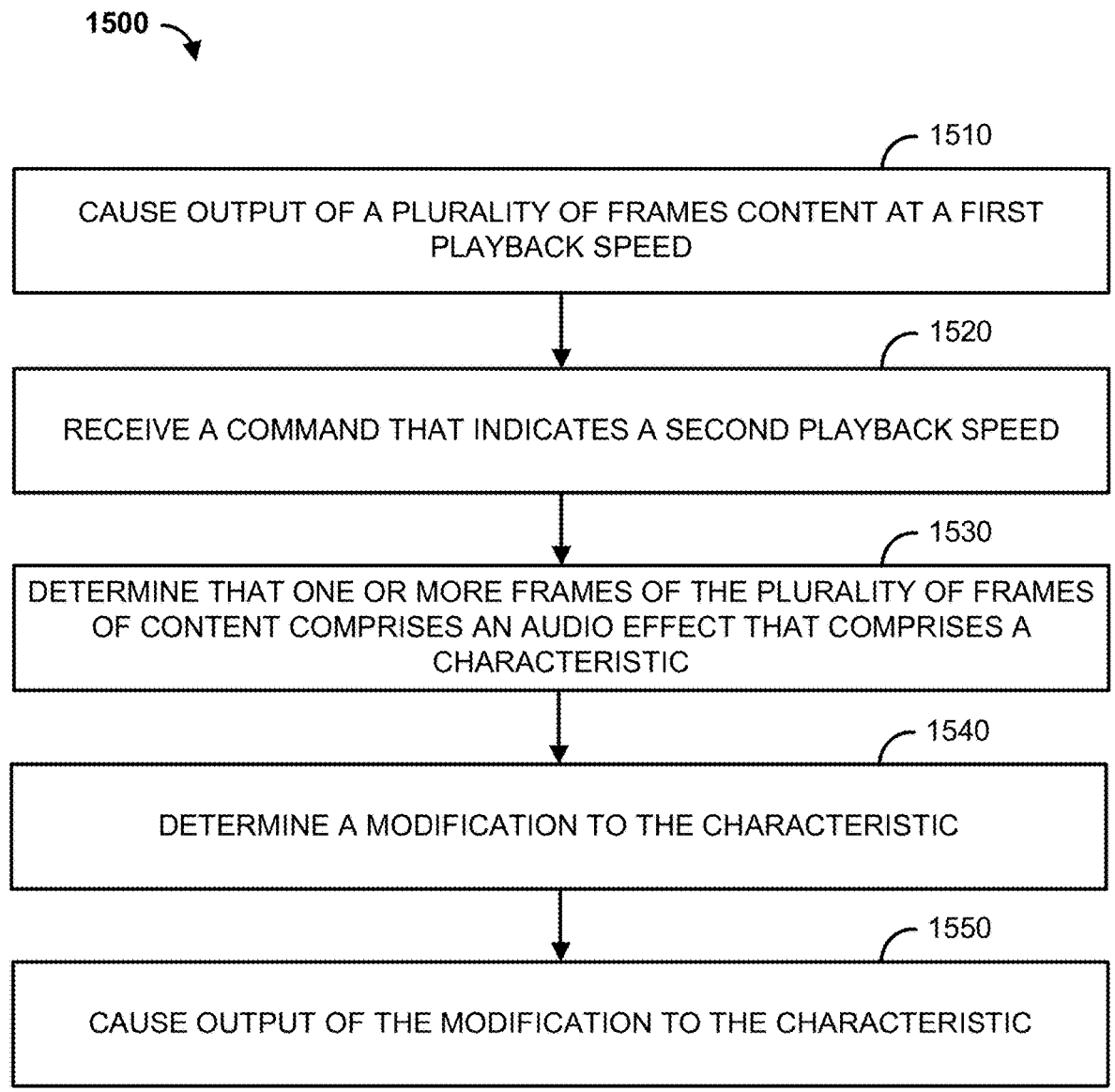
FIG. 15 shows a flowchart of an example method for condition mitigation.

FIG. 15 shows a flowchart of an example method 1500 for condition mitigation. At step 1510, output of a plurality of frames of content at a first playback speed may be caused (e.g., by the computing device 202, the display device 204, and/or the monitoring device 206 of FIG. 2). The content may be audio content that is output via a display device (e.g., the display device 204) and/or an audio output device (e.g., a speaker). The first playback speed may be a normal playback speed. The content may comprise metadata. The metadata may indicate an audio effect and/or a volume of the audio effect within the content. The content may have a plurality of frames. The plurality of frames may be displayed at the first playback speed.

At step 1520, a command that indicates a second playback speed may be received (e.g., by the computing device 202, the display device 204, and/or the monitoring device 206 of FIG. 2). The command may indicate to output the content at the second playback speed. The command may be received from a control device (e.g., a remote control) associated with a user. The second playback speed may be associated with a trick play operation. For example, the second playback speed may be a fast forward operation, a fast rewind operation, a slow forward operation, or a slow rewind operation. The second playback speed may cause the content to be presented at a faster rate or at a slower rate than the normal playback speed.

At step 1530, one or more frames of the plurality of frames of content comprises a audio effect that comprises a characteristic may be determined (e.g., by the computing device 202, the display device 204, and/or the monitoring device 206 of FIG. 2). The characteristic may impact a viewer with a condition. Determining that the audio effect associated with the content comprises the characteristic may comprise determining a change in volume and/or an audio frequency between frames of the content at the second playback speed. The audio effect may be one or more of a loud sound (e.g., a gunshot, an explosion) or an audio frequency that may impact a viewer with a condition. The characteristic may comprise at least one of a volume, a frequency, or an intensity of the audio. For example, the content, when played at the second playback speed, may cause the audio effect to impact the viewer with the condition. As an example, a threshold may indicate that causing output of the audio effect at the second playback speed may impact the viewer with the condition. The device may receive, from a monitoring device (e.g., the monitoring device 206 of FIG. 2), an indication that the audio effect associated with the content comprises the characteristic.

At step 1540, a modification to the characteristic may be determined (e.g., by the computing device 202, the display device 204, and/or the monitoring device 206 of FIG. 2). The characteristic (e.g., the content) may be modified to reduce the impact of the audio effect. For example, the volume of the content may be reduced by a certain amount in order to reduce the impact of the audio effect such that the audio effect within the content no longer satisfies the threshold. As another example, an audio frequency may be filtered or a volume associated with the audio frequency may be reduced in order to reduce the impact of the audio effect such that the audio effect within the content no longer satisfies the threshold.

At step 1550, output of the modification to the characteristic may be caused (e.g., by the computing device 202, the display device 204, and/or the monitoring device 206 of FIG. 2). For example, the content may be modified based on the modification, and the modified content may be output (e.g., displayed) on a display device (e.g., the display device 204). The modified content may be audio content that is output via a display device (e.g., the display device 204) and/or an audio output device (e.g., a speaker). The modified content may output at the second playback speed.

Figure 16:
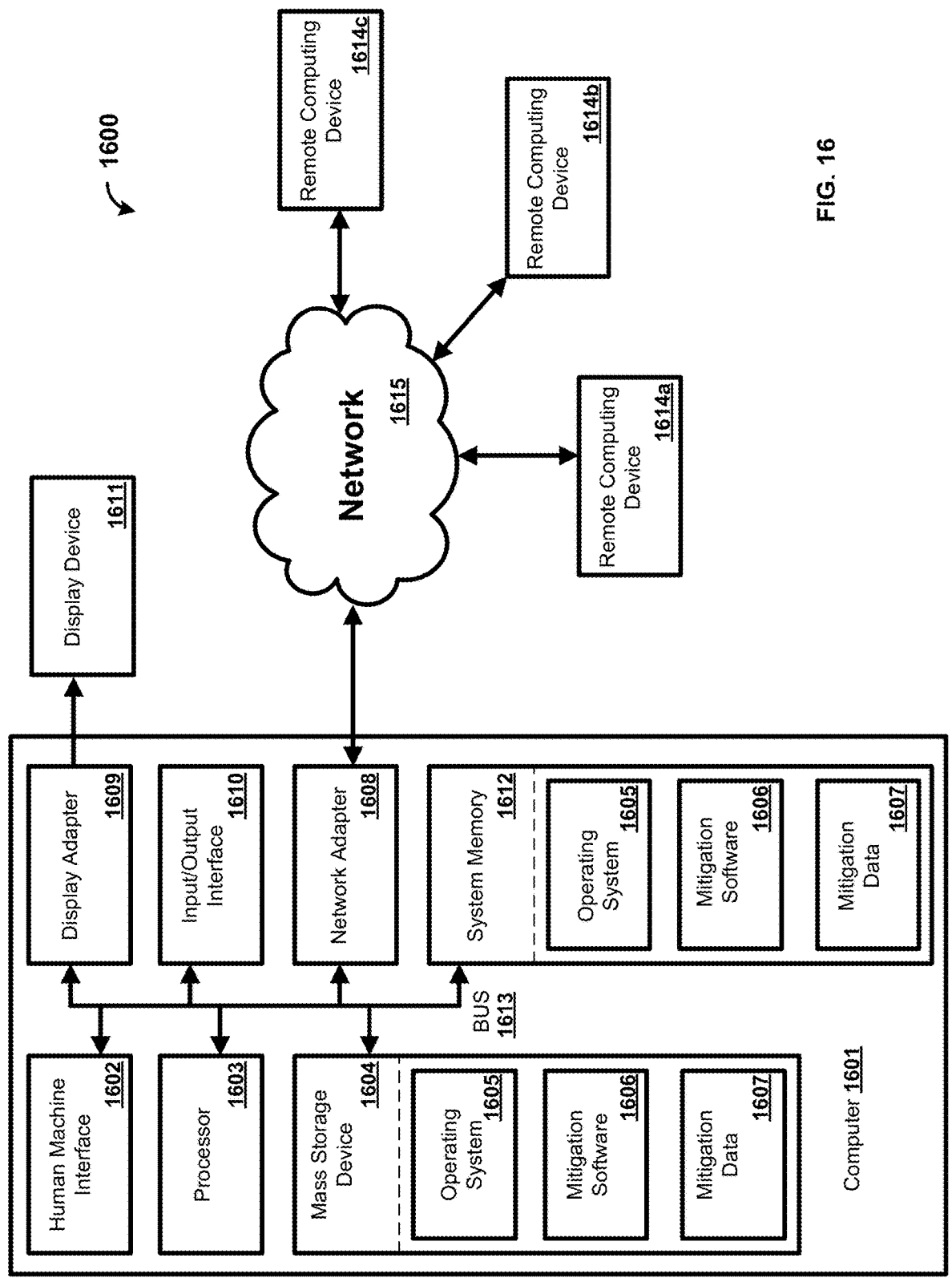
FIG. 16 shows a block diagram of a computing device.

FIG. 16 shows a block diagram 1600 of a computing device 1601. The server 110, the application server 126, the content source 127, and/or the edge device 128 of FIG. 1 may be a computer as shown in FIG. 16. The media device 120, the communication terminal 122, and/or the mobile device 124 of FIG. 1 may be a computer as shown in FIG. 16. The computing device 202, the display device 204, and/or the monitoring device 206 may be a computer as shown in FIG. 16.

The computer 1601 may comprise one or more processors 1603, a system memory 1612, and a bus 1613 that couples various system components including the one or more processors 1603 to the system memory 1612. In the case of multiple processors 1603, the computer 1601 may utilize parallel computing.

The bus 1613 is one or more of several possible types of bus structures, including a memory bus or memory controller, a peripheral bus, an accelerated graphics port, or local bus using any of a variety of bus architectures.

The computer 1601 may operate on and/or comprise a variety of computer readable media (e.g., non-transitory). The readable media may be any available media that is accessible by the computer 1601 and may include both volatile and non-volatile media, removable and non-removable media. The system memory 1612 may have computer readable media in the form of volatile memory, such as random access memory (RAM), and/or non-volatile memory, such as read only memory (ROM). The system memory 1612 may store data such as the mitigation data 1607 and/or program modules such as the operating system 1605 and the mitigation software 1606 that are accessible to and/or are operated on by the one or more processors 1603.

The computer 1601 may also have other removable/non-removable, volatile/non-volatile computer storage media. FIG. 16 shows the mass storage device 1604 which may provide non-volatile storage of computer code, computer readable instructions, data structures, program modules, and other data for the computer 1601. The mass storage device 1604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1604, such as the operating system 1605 and the mitigation software 1606. Each of the operating system 1605 and the mitigation software 1606 (or some combination thereof) may have elements of the program modules and the mitigation software 1606. The mitigation data 1607 may also be stored on the mass storage device 1604. The mitigation data 1607 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1615.

A user may enter commands and information into the computer 1601 via an input device (not shown). The input device may be, but not limited to, a keyboard, pointing device (e.g., a computer mouse, remote control, a touchpad), a microphone, a joystick, a scanner, tactile input devices such as gloves, and other body coverings, motion sensor, and the like These and other input devices may be connected to the one or more processors 1603 via a human machine interface 1602 that may be coupled to the bus 1613, but may be connected by other interface and bus structures, such as a parallel port, game port, an IEEE 1394 Port (also known as a Firewire port), a serial port, network adapter 1608, and/or a universal serial bus (USB).

The display device 1611 may also be connected to the bus 1613 via an interface, such as the display adapter 1609. It is contemplated that the computer 1601 may have more than one display adapter 1609 and the computer 1601 may have more than one display device 1611. The display device 1611 may be a monitor, an LCD (Liquid Crystal Display), light emitting diode (LED) display, television, smart lens, smart glass, and/or a projector. In addition to the display device 1611, other output peripheral devices may be components such as speakers (not shown) and a printer (not shown) which may be connected to the computer 1601 via the Input/Output Interface 1610. Any step and/or result of the methods may be output (or caused to be output) in any form to an output device. Such output may be any form of visual representation, including, but not limited to, textual, graphical, animation, audio, tactile, and the like. The display device 1611 and computer 1601 may be part of one device, or separate devices.

The computer 1601 may operate in a networked environment using logical connections to one or more remote computing devices 1614*a,b,c*. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1601 and a remote computing device 1614*a,b,c* may be made via a network 1615, such as a local area network (LAN) and/or a general wide area network (WAN). Such network connections may be through the network adapter 1608. The network adapter 1608 may be implemented in both wired and wireless environments. Such networking environments are conventional and commonplace in dwellings, offices, enterprise-wide computer networks, intranets, and the Internet. For example, the computer 1601 may communicate with the remote computing devices 1614*a,b,c* via one or more communication protocols such as infrared (IR) communication, ZigBee, or Bluetooth.

Application programs and other executable program components such as the operating system 1605 are shown herein as discrete blocks, although it is recognized that such programs and components reside at various times in different storage components of the computing device 1601, and are executed by the one or more processors 1603 of the computer. An implementation of the mitigation software 1606 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method, comprising, causing output of content at a first playback speed;
   receiving a command that indicates a second playback speed to output the content;
   comparing a first frame of the content to a second frame of the content;
   determining, based on the comparison of the first frame to the second frame, that a visual effect associated with the content when output at the second playback speed comprises a characteristic that impacts a viewer with a condition;
   determining a modification to the characteristic of the content, wherein the modification reduces the impact of the characteristic on the viewer with the condition; and
   causing output of the modification of the characteristic of the content at the second playback speed.

2. The method of claim 1, wherein the command comprises one or more of a fast forward command, a fast rewind command, a slow forward command, or a slow rewind command.

3. The method of claim 1, wherein the visual effect comprises one or more of a change in image contrast, a change in image patterns, a change in brightness, or a specific color.

4. The method of claim 1, wherein the characteristic comprises one or more of contrast, color, or brightness.

5. The method of claim 1, wherein determining the modification to the characteristic further comprises:
   determining that the characteristic satisfies a threshold, wherein satisfying the threshold indicates that the characteristic will impact the viewer with the condition; and
   modifying, based on the determination of the modification to the characteristic, the content, wherein the modification cause the characteristic to no longer satisfy the threshold.

6. The method of claim 1, further comprising receiving, from a monitoring device, an indication that the visual effect associated with the content impacts the viewer with the condition.

7. The method of claim 1, wherein the content comprises a plurality of frames, the method further comprising determining, based on the second playback speed, that one or more frames of the plurality of frames of the content comprises the characteristic that impacts the viewer with the condition.

8. A method, comprising,
   causing, by a computing device, output of content at a first playback speed;
   receiving a command that indicates a second playback speed to output the content;
   causing output of the content at the second playback speed;
   receiving, by the computing device and from a monitoring device, an indication that a visual effect associated with the content comprises a characteristic that impacts a viewer with a condition;
   determining a modification to the characteristic of the content, wherein the modification reduces the impact of the characteristic on the viewer with the condition; and
   causing output of the modification of the characteristic of the content at the second playback speed.

9. The method of claim 8, wherein the command comprises one or more of a fast forward command, a fast rewind command, a slow forward command, or a slow rewind command.

10. The method of claim 8, wherein the visual effect comprises one or more of a change in image contrast, a change in image patterns, a change in brightness, or a specific color.

11. The method of claim 8, wherein the characteristic comprises one or more of contrast, color, or brightness.

12. The method of claim 8, wherein the indication indicates that a change in a brightness between frames of the content, at the second playback speed, impacts the viewer with the condition.

13. The method of claim 8, wherein determining the modification to the characteristic further comprises:
   determining that the characteristic satisfies a threshold, wherein satisfying the threshold indicates that the characteristic will impact the viewer with the condition; and
   modifying, based on the determination of the modification to the characteristic, the content, wherein the modification causes the characteristic to no longer satisfy the threshold.

14. The method of claim 8, wherein the content comprises a plurality of frames, the method further comprising determining, based on the second playback speed, that one or more frames of the plurality of frames of the content comprises the characteristic that impacts the viewer with the condition.

15. A method, comprising,
   causing output of audio content;
   determining that one or more frequencies of the audio content, when output, impact a health condition of a viewer;
   determining, based on a characteristic of the one or more frequencies satisfying a threshold, a modification to the one or more frequencies in the audio content, wherein satisfying the threshold indicates that that the characteristic will impact the health condition of the viewer and wherein the modification reduces the impact of the one or more frequencies on the health condition of the viewer; and causing output of the modification of the one or more frequencies of the audio content.

16. The method of claim 15, wherein the modification to the one or more frequencies comprises one or more of a change in volume of the one or more frequencies, a change in the one or more frequencies, or a filtering of the one or more frequencies.

17. The method of claim 15, wherein determining the modification to the one or more frequencies further comprises:

modifying, based on the determination of the modification to the one or more frequencies, the audio content, wherein the modification causes the characteristic to no longer satisfy the threshold.

18. The method of claim 15, further comprising receiving, from a monitoring device, an indication that the one or more frequencies of the audio content impact the health condition of the viewer.

19. The method of claim 15, further comprising determining, based on a playback speed, that the one or more frequencies of the audio content impact the health condition of the viewer when output at the playback speed.

20. The method of claim 19, wherein the audio content comprises a plurality of audio frames, the method further comprising determining, based on the playback speed, that one or more audio frames of the plurality of audio frames of the audio content comprises the one or more frequencies that impacts the health condition of the viewer.

21. The method of claim 1, wherein the first frame precedes the second frame in the content.

22. The method of claim 1, wherein the second frame precedes the first frame in the content.

23. The method of claim 1, wherein the condition is one of photosensitive epilepsy, post-traumatic stress disorder, anxiety, headaches, or migraines.

24. The method of claim 8, wherein the condition is one of photosensitive epilepsy, post-traumatic stress disorder, anxiety, headaches, or migraines.

25. The method of claim 15, wherein the health condition is one of post-traumatic stress disorder, anxiety, headaches, or migraines.

* * * * *